US010475040B2

(12) United States Patent
Singh

(10) Patent No.: US 10,475,040 B2
(45) Date of Patent: Nov. 12, 2019

(54) SYSTEM AND METHOD FOR SERVICE CHAIN VISUALIZATION AND MONITORING OF REUSABLE COMMODITIES

(71) Applicant: Entercoms, Inc., Irving, TX (US)

(72) Inventor: Rahul Singh, Coppell, TX (US)

(73) Assignee: ENTERCOMS, INC., Irving, TX (US)

( * ) Notice: Subject to any disclaimer, the term of this patent is extended or adjusted under 35 U.S.C. 154(b) by 0 days.

(21) Appl. No.: 14/068,779

(22) Filed: Oct. 31, 2013

(65) Prior Publication Data

US 2014/0244340 A1    Aug. 28, 2014

Related U.S. Application Data

(60) Provisional application No. 61/767,924, filed on Feb. 22, 2013.

(51) Int. Cl.
*G06Q 30/00* (2012.01)
*G06Q 10/08* (2012.01)

(52) U.S. Cl.
CPC .......... *G06Q 30/00* (2013.01); *G06Q 10/087* (2013.01)

(58) Field of Classification Search
None
See application file for complete search history.

(56) References Cited

U.S. PATENT DOCUMENTS

2007/0299716 A1* 12/2007 Shorter et al. ............... 705/10
2007/0299748 A1* 12/2007 Shorter et al. ............... 705/28
2008/0004740 A1*  1/2008 Tamarkin et al. ......... 700/106
2010/0274684 A1* 10/2010 Melander .................... 705/28

OTHER PUBLICATIONS

Fleischmann et al, Quantitative Models for Reverse Logistics: A review, 1997, European Journal of Operations Research 103 (1997) 1-17.*
Van der Laan et al, Product remanufacturing and disposal: A numerical comparison of alternative control strategies, Int. Journal of Production Economics 45 (1996) 489-498.*
Van der Laan et al, production planning and inventory control with remanufacturing and disposal, European Journal of Operations Research 102 (1997) 264-278.*
Omer Benli, Dynamic Programming, https://web.archive.org/web/20011207032229/http://www.csulb.edu/~obenli/Research/IE-encyc/dynprog.html, Dec. 2001.*

* cited by examiner

*Primary Examiner* — Mehmet Yesildag
(74) *Attorney, Agent, or Firm* — Kent B. Chambers; Terrile, Cannatti & Chambers, LLP

(57) ABSTRACT

A service chain visualization system graphically displays diverse supply chain information such as demand information, new buy information, defective returns information, out for repair information, good inventory information and bad inventory information. The display includes historical, present, and future supply chain information. In at least one embodiment, the system allows a user to change a supply chain attribute and observe the potential impact on other supply chain attributes. In at least one embodiment, the system graphically collectively displays results that are readily understandable by the user.

28 Claims, 11 Drawing Sheets

100

106

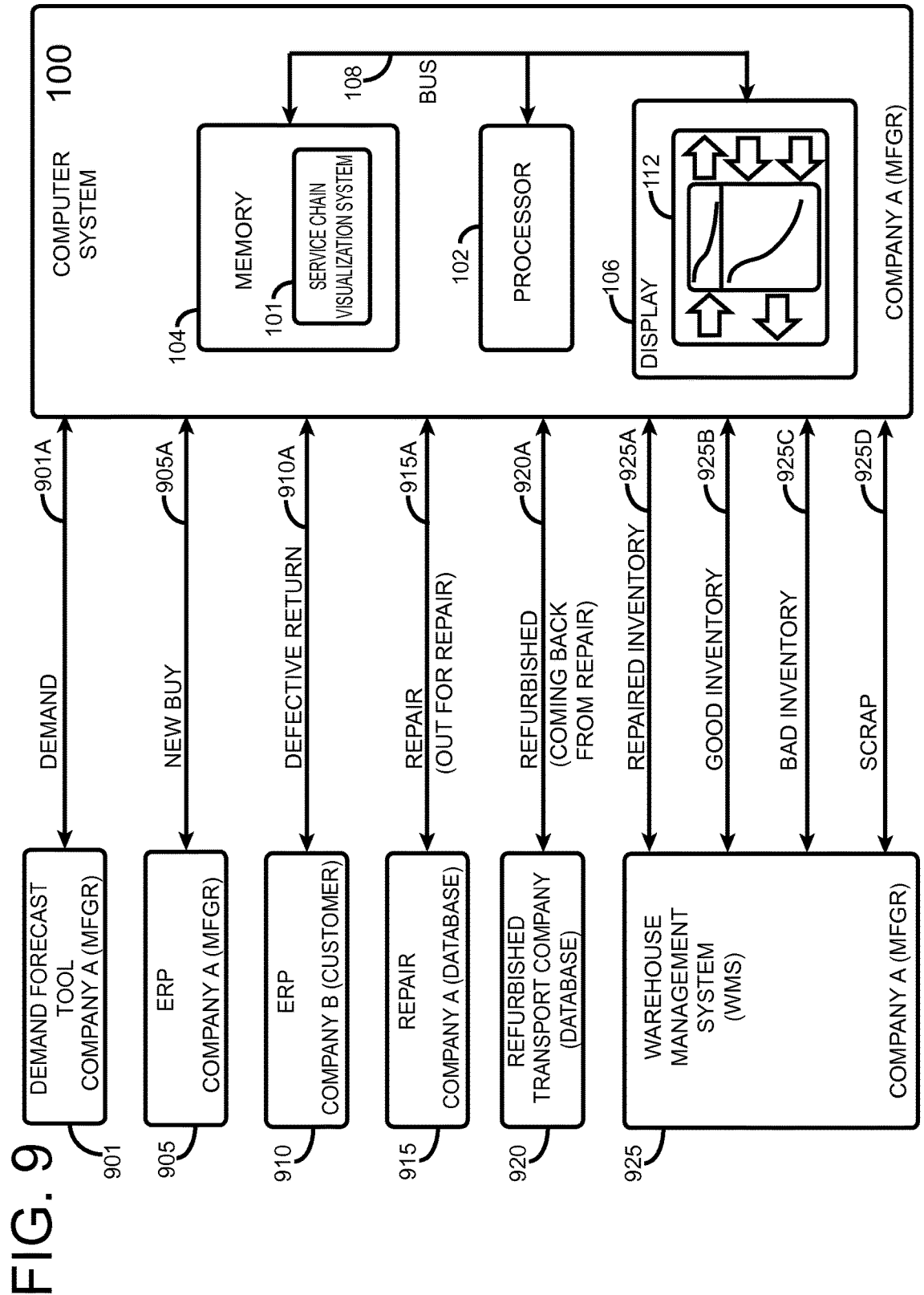

SYSTEM AND METHOD FOR SERVICE CHAIN VISUALIZATION AND MONITORING OF REUSABLE COMMODITIES

FIELD OF THE INVENTION

The disclosures herein relate generally to supply chain applications, and more particularly, to service supply chain applications that visualize supply chain information for users.

DESCRIPTION OF THE RELATED ART

Some computer systems employ specialized applications to assist supply chain managers in the management of forward supply chains. The term "forward supply chain" refers to a supply chain for providing commodities to building a new, finished product that includes multiple commodities. The forward supply chain focuses primarily on the development, manufacturing, and shipping of new products to customers. Numerous applications are available to assist forward supply chain managers in the management of forward supply chains for new finished products. For example, demand applications may assist in the forecasting of new product demand. Warehouse management system (WMS) applications may assist in managing warehouse inventory for new product commodities. Development applications, fulfillment applications, transportation modeling applications, and numerous other applications are available for managing the forward supply chain as well.

The terms "service chain" and "reverse supply chain" refers to a supply chain involving the return of defective products and other returned products of which some commodities may be available for reuse to create working products and the commodities used to effectuate repairs and reconditioning. While some returned products or commodities can be used as-is without repair, other returned products may need repair before being reused. Another type of re-use may include sale of the returned product or scrapping the returned product. However, the service chain often involves repair of products. Because the service chain deals with flows in both forward and reverse directions, and with defective as well as non-defective products, the complexity of service chain management function tends to be very high. Spreadsheet applications or other software applications provide one way to display hundreds, thousands, or tens of thousands of parts entering and exiting a service center. Unfortunately, due to their complexity, these applications may overwhelm the user with raw numbers that, by themselves, are difficult to interpret.

BRIEF SUMMARY

In one embodiment, a method of visualizing a service chain includes displaying in a visual representation an inventory of commodities. The method also includes displaying in the visual representation multiple input flows of commodities into the inventory for service chain operations. The method further includes displaying in the visual representation one or more output flows of commodities from the inventory representation.

In one embodiment, a computer system includes a processor and a memory coupled to the processor, the memory including a service chain visualization system that is configured to display in a visual representation an inventory of commodities. The service chain visualization system is also configured to display in the visual representation multiple input flows of commodities into the inventory for service chain operations. The service chain visualization system is further configured to display in the visual representation one or more output flows of commodities from the inventory representation.

In another embodiment, a non-transitory computer readable medium includes instructions executable by a computer system. The instructions are for displaying in a visual representation an inventory of commodities. The instructions are also for displaying in the visual representation multiple input flows of commodities into the inventory for service chain operations. The instructions are further for displaying in the visual representation one or more output flows of commodities from the inventory representation.

In one embodiment, the disclosed methodology helps business users visualize the key flows and metrics in a service supply chain in a compact form that can easily be displayed on handheld or computer display, while allowing basic interactions for the business user to ask what-if questions.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 9 depicts a block diagram that depicts a service chain visualization system together with multiple information sources providing service chain information to the service chain visualization system.

DETAILED DESCRIPTION

Figure 1A:
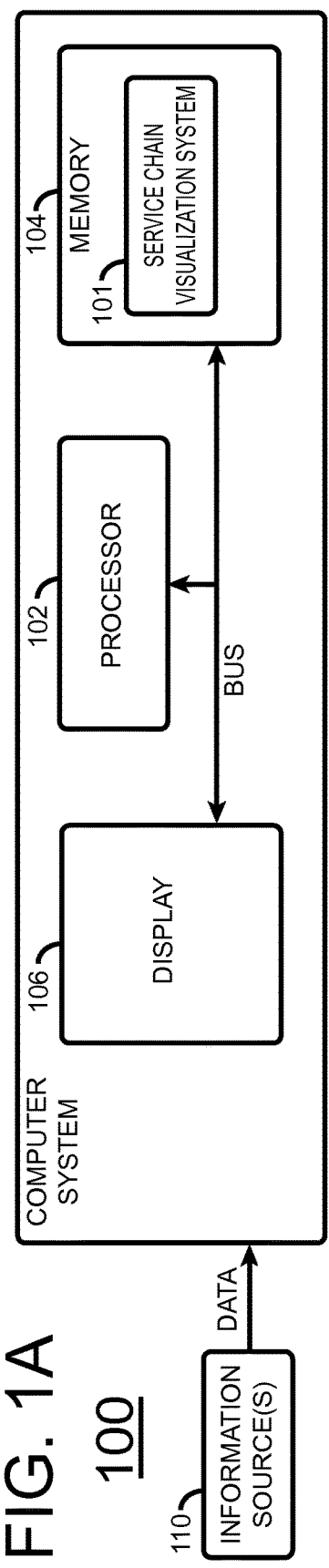
FIG. 1A depicts a simplified block diagram of a computer system that includes a service chain visualization system.

In one embodiment, a service chain visualization system and method determines and displays a visual representation of commodity flows into and out of an inventory representation. In at least one embodiment, the service chain visualization system transforms complex, multi-faceted, and numerically overwhelming data sets into a useful and human user apprehensible visual representation. Thus, in at least one embodiment, the service chain visualization system allows a user to quickly understand the dynamics of a service chain inventory. Additionally, the service chain visualization system presents a flexible platform for expanding and contracting the level of visualization granularity. For example, in at least one embodiment, the service chain visualization system presents a visualization of input and output flows at various system and/or subsystem levels. In at least one embodiment, the service chain visualization system utilizes symbology for commodity input and output flows that not only represent the flows but, in at least one embodiment, also concurrently represents multiple dimensions of a multi-dimensional nature of each flow with respect to the other flows. Examples of the multiple dimensions include the particular type of flow, the flow volume, the direction with respect to inventory, i.e. input or output, price, etc. The unique presentation of the service chain at various levels of detail allows a user, in at least one embodiment, to quickly gain insight into the dynamic inventories associated with the service chain. Additionally, in at least one embodiment, the service chain visualization system and method also allow users to interact with the system to perform, for example, simulations such as 'what if' type analyses. The service chain visualization system accesses and displays data to provide a visualization of the service chain. To perform a simulations, in at least one embodiment, the service chain visualization system utilizes data provided or selected by the user for processing and incorporate results into the visual representation. The data provided or selected by the user can be used in conjunction with or as a substitute for actual data. For example, in at least one embodiment, the user can modify a certain quantity, such as detective returns, and the service chain visualization system will process the modified data, determine effect(s) on other data, if any, and incorporate the results into the visual representation. The particular data inputs by the user are a matter of design choice and include, for example, quantities, relative modifications (such as adjust repairs up by X % and/or adjust demand down by Y %), and the addition or elimination of one or more aspects of the visual representation.

While the disclosed service chain visualization system is applicable to many different contexts, it is helpful to consider the inventory visualization system in a representative scenario wherein a company A provides returns management, warranty, repair, and refurbishment of products manufactured by one or more other companies, such as company B. In the above scenario, company A receives returned products manufactured by company B. The products may be returned, for example, by company B's customers or from purchasers of company B's products through a sales or lease distribution network. These returned, finished products include commodities that may be reusable to service other products needing repair. For example, the products can be laptop computers, and the returned laptop computers may include commodities such as motherboards, storage devices, and displays as well as other reusable commodities. Some of these commodities may be good, i.e. in functional condition. Other commodities may be bad, i.e. currently defective, and become scrap or repairable. The usage of the term "may" indicates that a particular entity has the capability to perform an identified function and does perform that function in at least one embodiment. The service chain visualization system is applicable to any product that may be returned for, for example, repair, refurbishment, or sourced for parts.

To facilitate timely repairs and refurbishment, company A maintains an inventory of commodities. The inventory includes both good inventory and bad inventory. Good inventory represents stored, properly functioning commodities. Bad inventory represents stored but currently non-properly functioning commodities. At its option, company A can convert commodities in had inventory to commodities in good inventory by repairing the commodities either itself or by a repair facility.

Various sources of commodity flow into and out of inventory exist in a service chain. Following is one embodiment of inventory input and output commodity flows:

1) Exemplary Input Flow: a new buy flow represented by new commodities that company A purchases for the purpose of repairing returned products. These new buy commodities are stored in good inventory. The good inventory is available to meet the demand for commodities to repair returned products.
2) Exemplary Input Flow: a defective return flow represents returned products that users return to company A as being defective. These returned products may or may not actually be defective. However, initially company A stores these products in had inventory. The commodities in the returned products may be reusable to repair other returned products after inspection and/or repair of the commodity.
3) Exemplary Input Flow: a refurbished flow represents a flow of refurbished, i.e. repaired, commodities into good inventory, as received from the repair facility. Another term for the refurbished flow is a refurbishing complete flow.
4) Exemplary Output Flow: a repair flow represents commodities of the defective returned products that are sent to a repair facility for repair. Bad inventory provides this repair flow of commodities to the repair facility.
5) Exemplary Output Flow: a demand flow that effectively consumes good commodities from good inventory.

In at least one embodiment, the service chain visualization system reduces the complexity of the service chain visualization while maintaining a granularity and representation of features that provide a sufficient level of insight into the service chain. Furthermore, in at least one embodiment, the service chain visualization system utilizes symbology that represents multiple dimensions of a complex process is an easily understandable presentation. For example, the service chain visualization system may visually depict each input and output flow using any desirable symbology. For example, each of the foregoing flows can be represented in terms of either monetary values (e.g. dollars), volume (e.g. quantity of units), or both dollars and units, at the selection of the system user. The visualization system may also express the size of good inventory and bad inventory in terms of either monetary values, volume, or both dollars and units, at the selection of the system user. Furthermore, in at least one embodiment, the actual data underlying the flows may be static for a period of time or dynamic over a shorter period of time and, thus, the service chain visualization system can be static or dynamic.

FIG. 1A is a simplified block diagram of a computer system 100 used to implement a service chain visualization system 101 to display a representation of a service chain to a user. In at least one embodiment, the service chain visualization system 101 is implemented as a computer program, stored in memory 104 and executable by a processor 102. The information source(s) 110 provide data relevant to the service chain that the service chain visualization system 101 processes to depict various symbolic representations of the service chain. The implementation of the service chain visualization system 101 is a matter of design choice and can be implemented as a computer program executable in a computer system, implemented in customized hardware such as with field programmable gate arrays, or with a combination of hardware and software. The service chain visualization system 101 may be implemented in different types of computer systems, for example handheld phones, tablet devices, laptop/notebook computers, desktop computers with traditional displays and computers with large monitors. In one embodiment, the visual density of the information that the service chain visualization system 101 displays is selected to be a level at which the displayed information is easily understood in various settings and at different levels of management.

Figure 1B:
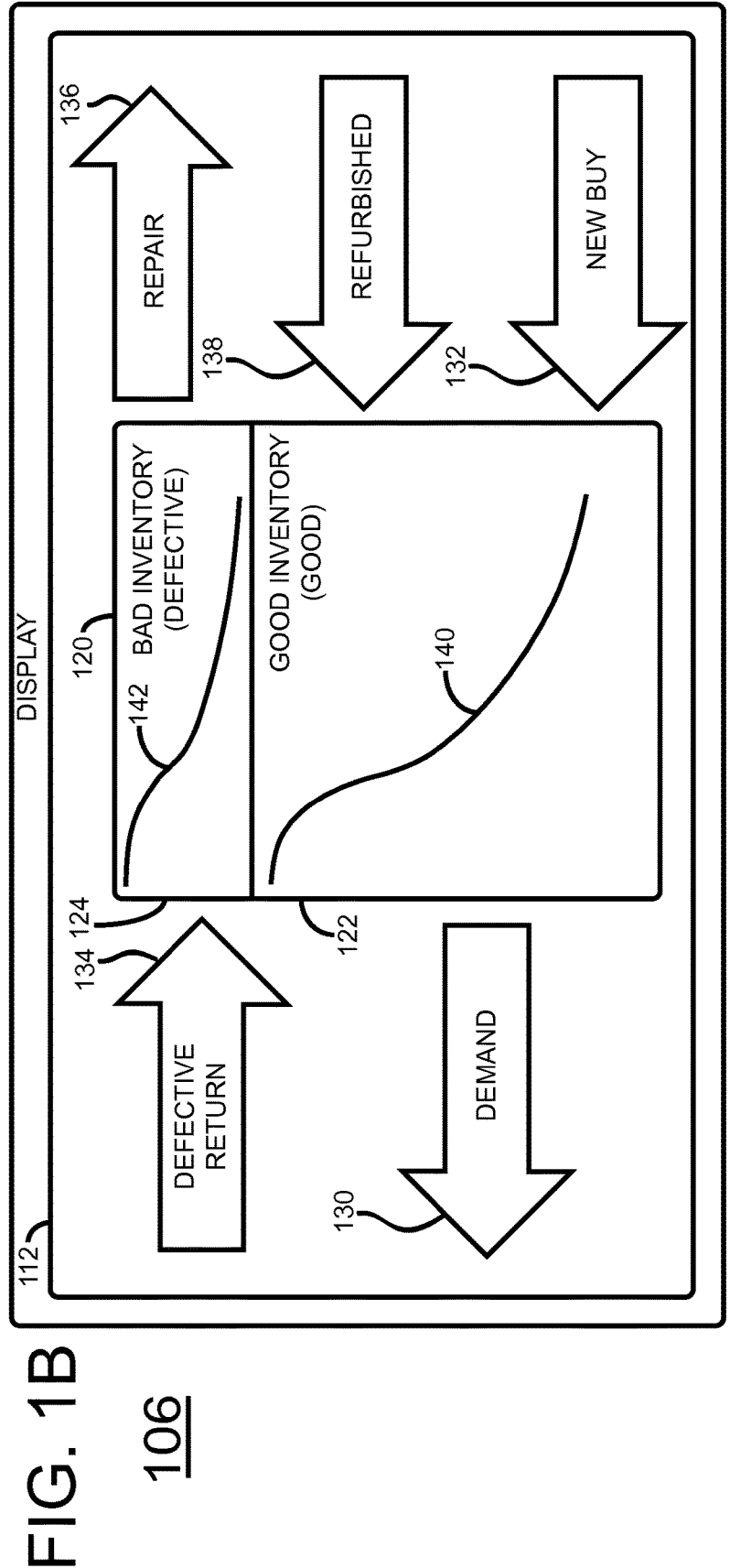
FIG. 1B depicts a representation of a service chain visual representation that the disclosed service chain visualization system generates on a display.

FIG. 1B depicts an exemplary service chain visual representation 112 of a service chain with input and output flows into an inventory for an exemplary service chain. As shown in FIG. 1B, in one embodiment, the service chain visualization system 101 generates the visual representation 112 on display 106 that shows the entire service chain for inventory 120 in a single view. The service chain visual representation 112 displays an inventory 120 that includes good inventory 122 and bad inventory 124. The service chain visual representation 112 includes a demand flow 130, a new buy flow 132, a defective return flow 134, a repair flow 136 and a refurbished flow 130. In at least one embodiment, these multiple input flows and output flows together with good inventory 122 and had inventory 124 form a balanced, closed-loop system. In at least one embodiment, the visual representation 112 relates to a common commodity type or set of commodity types, such as a computer motherboard or a hard drive assembly.

Demand flow 130 is fed by good inventory 122. Good inventory 122 represents the number of good commodities in inventory 120. Bad inventory 124 represents the number of bad, i.e. defective, commodities in inventory 120. Defect return flow 134 represents the number of commodities returned as being defective. Repair flow 136 represents the number of defective commodities sent for repair. Refurbished flow 138 represents the number of repaired commodities returned to good inventory 122 by, for example, a repair facility. Products not returned to good inventory 122 may be scrapped. As described in the following discussion, service chain visualization system 101 expresses these flows and inventories in terms of one or more dimensions such as namely a number of commodities and/or monetary value. The service chain visualization system 101 is an adaptable generalized system that is applicable at the product level, the business level and the geographic level.

Figure 2:
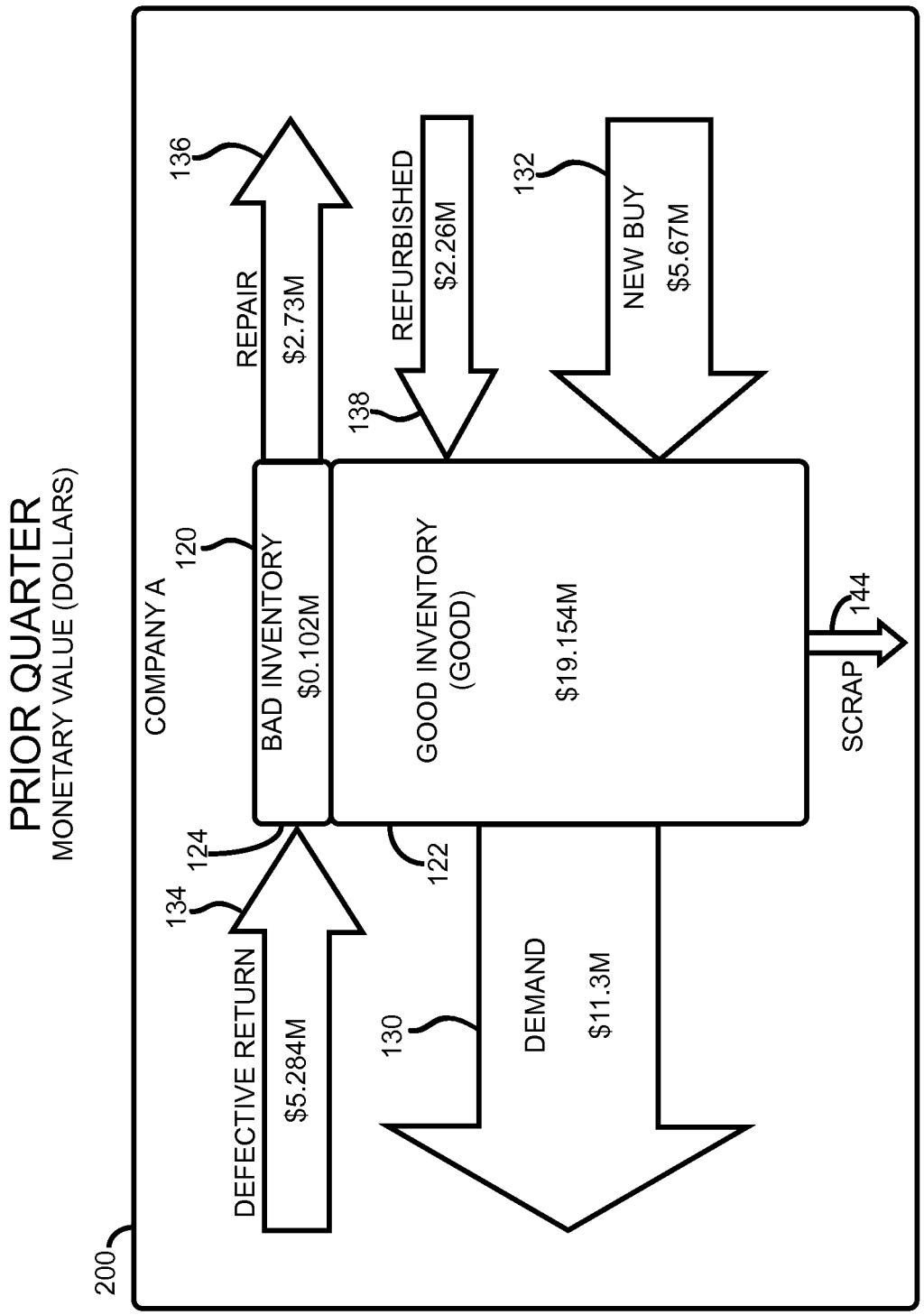
FIG. 2 depicts a representation of a service chain visual representation that the disclosed service chain visualization system generates to show the monetary value of flows and the monetary value of inventory.

FIG. 2 depicts a service chain visual representation 200, which represents one embodiment of the service chain visualization 112. The service chain visualization 200 depicts the service chain for company A. The input and output flows utilize symbology that represents multiple dimensions of the service chain commodity flow. The symbology in the service chain visualization 200 utilizes 2-dimensional arrows with the direction indicated input or output flow and the height representing the relative monetary value of the flow. The service chain visual representation 200 depicts a service chain view for a prior calendar quarter. In this particular example, a demand forecast predicting system, such as Demantra by Oracle Corporation, supplies demand prediction data to service chain visualization system 101 to generate the data represented by the demand flow 130. A user may use visualization system 101 to adjust the various flows into and out of inventory 120 to meet a particular demand flow 130. In this particular example, the monetary value of demand flow 130 for the commodity motherboards over the prior quarter is $11.3M, as shown in demand flow 130. The new buy flow 132 of motherboards provides a large portion of the motherboards in good inventory 122 that ultimately service demand flow 130. Refurbished flow 138 also provides good motherboards to good inventory 122 to service a portion of demand flow 130 for motherboards.

In this particular example, the defective return flow 134 of defective commodities from users is $5.284M. The value of commodities in bad inventory 120 is $0.102M. The value of commodities in good inventory 122 is $19.154M. In this example, company A sends $2.73M of defective commodities from bad inventory 120 to a repair facility (not shown). The repair flow 136 is thus $2.73M. Repair flow 136 indicates commodities out-for-repair. However, the repair facility is typically unable repair all of the defective commodities in repair flow 136. In this particular example, the repair facility refurbishes $2.26M of commodities to provide refurbished flow 138 (also referred to as "refurbishing complete flow"). When the refurbished commodities return to company A, the refurbished motherboards join good inventory 122 as repaired inventory within good inventory 122.

As seen in FIG. 2, service chain visual representation 200 pictorially displays good inventory 122 and bad inventory 124 as well as the flows into and out of these inventories. The sizes of the symbols representing the inventory and flows vary with the monetary value of the inventories and flows depicted in common visual representation 112. For example, respective rectangles represent good inventory 122 and bad inventory 124. Good inventory 122 includes $19.154M of good motherboards, while bad inventory 124 includes $0.102M of motherboards. Thus, the size of the rectangle that pictorially depicts good inventory 122 is much larger than the size of the rectangle that pictorially depicts bad inventory 124.

The particular symbols used in the service chain visual representation 200 is a matter of design choice. In the embodiment of FIG. 2, arrow symbols represent the flows into and out of inventory 120. The size of each arrow directly corresponds to the monetary value, i.e. dollar value, of that flow in this particular embodiment. For example, the size of the arrow representing defective return flow 134 is larger than the size of the arrow representing repair flow 136. This is true because, in this particular example, bad inventory 124 receives more defective returns than the value of the goods in repair flow 136 that company A sends to the repair facility. Likewise, the size of the arrow that represents new buy flow 132 is more than twice the size of the arrow that represents refurbished flow 138 because the monetary value of new buy motherboards, namely $5.67M, is more than twice the monetary value of the refurbished motherboards 138 namely $2.26M. In one embodiment, the size of symbols (e.g. arrows, rectangles) is determined by a linear or non-linear transformation function which relates the underlying quantity (e.g. inventory value) to the size of the corresponding symbol that represents that quantity in service chain visual representation 200.

Figure 3:
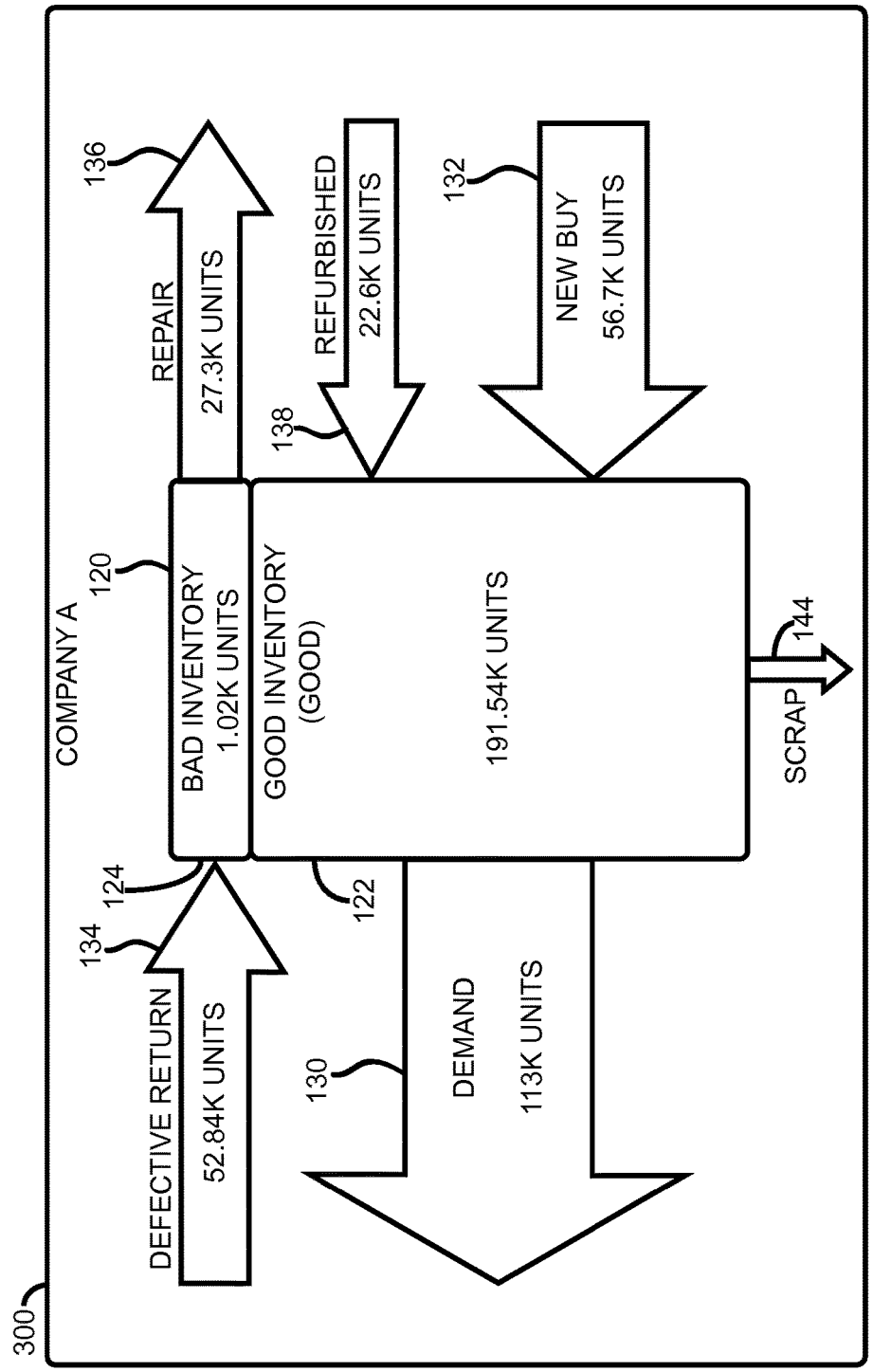
FIG. 3 depicts a service chain visual representation generated by service chain visualization system generates that shows the quantity of units in flows and the quantity of units in inventory.

FIG. 3 depicts service chain visual representation 300, which represents another embodiment of the service chain visual representation 112. The service chain visual representation 300 depicts the same flows and inventories as FIG. 2, except that the flows and inventories are expressed in terms of a different dimension, i.e. the quantity of commodities rather than the monetary value of such commodities. In a manner similar to that of FIG. 2, the sizes of the symbols in FIG. 3 correspond directly to the numbers of motherboard units that the geometric structures represent. For example, the sizes of the arrows that represent demand flow 130, new buy flow 132, defective return flow 134, repair flow 136 and refurbished flow 138 correspond directly to the quantity of motherboard units represented by such arrows. In this particular example, demand flow 130 exhibits a size, i.e. dimensions, that represent 113K motherboard units. New buy flow 132 exhibits a size, i.e. dimensions, that represent 56.7K motherboard units. Defective return flow 134, repair flow 136, and refurbished flow 138 exhibit sizes corresponding to 52.8 4K motherboard units, 27.3 K motherboard units, and 22.6 K motherboard units, respectively. In a similar manner, the rectangle sizes, i.e. dimensions, of good inventory 122 and bad inventory 124 represent 191.5 4K motherboard units and 1.02K motherboard units, respectively.

In at least one embodiment, the symbols in the service chain visual representation can represent other or additional dimensions of the inventory. For example, three-dimensional symbols can represent additional dimensions. Variations of colors, shading, textures, etc. can be used to represent additional dimensions. The particular choices are a matter of design choice.

In one embodiment of the user of the service chain visualization system 101, Company A employs service chain visualization system 101 to visualize information from 8 different sources as depicted in Table 1 below:

TABLE 1

| STAGE DESCRIPTION | LOCATION |
| --- | --- |
| 1) NEW BUY | ERP |
| 2) DEFECTIVE RETURN (DEF P/N) | Customer ERP |
| 3) REPAIR (OUT-FOR-REPAIR) | Offline Database |
| 4) REFURBISHED (COMING BACK FROM REPAIR) | Transportation Company |
| 5) REPAIRED INVENTORY | WMS |
| 6) GOOD INVENTORY | WMS |
| 7) BAD INVENTORY | WMS |
| 8) SCRAP | WMS |

Service chain visualization system 101 integrates the information from these eight, disparate sources to enable the user to better interpret and, thus, better manage the service chain. Table 1 summarizes multiple different stages in the repair life cycle of a particular potentially reusable commodity. A motherboard represents a reusable commodity for the following example. The new buy stage refers to newly purchased motherboards that company A stores in good inventory 122. Even though new, it is possible that some of these motherboards may in fact be defective. After testing, Company A may move defective motherboards from good inventory 122 to bad inventory 124. Company A may retrieve new buy information from the company's Enterprise Resource Planning (ERP) system. More specifically, service chain visualization system 801 may retrieve new buy information from the ERP system of Company A. Service chain visualization system 801 may also retrieve defective part number (DEF P/N) information from the ERP system of the customer, namely Company B, or other customer that is returning a commodity as being defective. Such defective part numbers identify commodities in the defective return flow 134.

Service chain visualization system 101 may also retrieve out-for-repair information from a database accessible to the visualization system 101. Such an off-line database records the amount of defective inventory sent on for repair to the repair facility. Service chain visualization system 101 also accesses refurbished information, i.e. coming-back-from-repair information, from one or more transportation companies that ship refurbished commodities such as motherboards from the repair facility back to good inventory 122 of Company A. Service chain visualization system 101 also accesses repaired inventory information that records the amount of repaired inventory within good inventory 122. This repaired inventory information may be available in a warehouse management system (WMS) system of Company A. In this manner, service chain visualization system 101 integrates information from multiple disparate sources to generate a unified single view in which the user may readily understand the service supply chain for a particular commodity.

Service chain visualization system 101 combines information from the eight different information sources of Table 1 to enable the user to make service chain decisions by referencing a single view in one embodiment. For example, the user may substitute a different new buy information value for new buy flow 132 of FIG. 3 and watch the impact that such a change has on repaired inventory in the visual representation of FIG. 3. The size of the arrows representing the flows in FIG. 3 changes according to the quantity of units in those flows. A larger arrow size represents a quantity of units flow and a smaller arrow size represents a smaller quantity of units flow.

Referring still to FIG. 3, in one scenario if a user desires to determine the impact of increasing the number of new buys, then the user inputs into service chain visualization system 801 the increased new amount of new buys. In response, service chain visualization system 801 increases the size of the arrow representing the new buy flow 132 to a size corresponding to the revised, i.e. updated, new buy flow value in terms of motherboard units. When the number of new buys increases, the quantity of refurbished motherboard units needed to supplement the new buys to meet demand flow 130 from good inventory 122 decreases. Service chain visualization system 801 correspondingly decreases the size of the arrow representing repair flow 136 and the size of the arrow representing refurbished flow 138 within service chain visual representation 112. The size of the arrow or other geometric object that represents a particular flow provides a directly varying representation of the velocity of that flow. For example, an arrow exhibiting a larger geometry represents a higher velocity (motherboards per unit time) than an arrow exhibiting a smaller geometry.

Returning to FIG. 1B, it is noted that not all inventory moves as fax as other inventory. Some inventory moves very quickly, while other inventory moves more slowly. The service chain visual representation 112 of FIG. 1B includes a good inventory profile curve 140 drawn inside good inventory 122. The vertical dimension of good inventory profile curve 140 represents dollars or units, while the horizontal dimension thereof represents time. Good inventory profile curve 140 shows a scenario wherein good inventory first decreases relatively slowly over time, then decreases rather rapidly over time and then falls more slowly as time moves on. In at least one embodiment, service chain visualization system 101 updates the good inventory profile curve 140 as system 101 receives inventory update information from the information sources 100 as, for example, specified in Table 1. For example, new buy flow information from Company A's ERP system, defective return flow information from Company B's ERP system (a customer), the out-for-repair flow information from an offline database, the refurbished flow information from a transportation company, and the repaired inventory information from Company A's WMS. Service chain visualization system 101 also displays a bad inventory profile curve 142 within bad inventory 120 in FIG. 1B or elsewhere in service chain visual representation 112 should sufficient space not be available to legibly draw a bad inventory profile curve within bad inventory 120. Likewise, if there is insufficient room within good inventory profile curve 140 to display good inventory profile curve 140, service chain visualization system 101 may display good inventory profile curve 140 elsewhere in service chain visual representation 112.

Through "harvesting", Company A may actively seek the return of defective units that remain in the field but which otherwise might not be returned. Harvested returns are included as part of the defective return flow 134, as seen in FIG. 3. Thus, bad inventory 124 may include an increasing body of defective motherboards or other reusable commodity. Company A may elect to send these defective motherboards for repair or not send these defective motherboards for repair at whatever rate it chooses. Service chain visualization system 101 displays the quantity of motherboards units sent to a repair facility as repair flow 136. The repair facility may not be able to repair all motherboards that it receives. Thus, the repair facility exhibits a repair yield rate that is reflected in a refurbished flow 138 that is less than the repair flow 136. The number of refurbished units in flow 138 affects the new flow 132. The larger the refurbished flow 138 becomes, the smaller the new flow 132 needs to be. Refurbished flow 138 balances new buy flow 132, i.e. when one goes up the other goes down, to fulfill the same demand flow 130. Service chain visual representation 112 also includes a scrap flow 144 that represents unrepairable and/or obsolete commodities from inventory 120 that are sent to scrap. Like demand flow 130 and repair flow 136, scrap flow 144 is an output flow from inventory 120. Defective return flow 134, refurbished flow 138 and new buy flow 132 are input flows to inventory 120. Supply chain visualization system 801 links all of these disparate flows together to provide the unified service chain visual representation 112. This enables the user of system 101 to quickly apprehend the system dynamics of the representative service chain.

Service chain visualization system 101 links all of the input flows and output flows, good inventory and bad inventory together. For example, visualization system 801 receives as input the input flows that FIG. 2 depicts, namely defective return flow 134, refurbished flow 138 and new buy flow 132. Visualization system 101 also receives values corresponding to output flows, namely demand flow 130, repair flow 136 and scrap flow 144. Upon initialization of visualization system 801, visualization system 801 receives starting values for good inventory 122 and bad inventory 124. While FIG. 2 expresses the values corresponding to the flows and inventories in monetary terms (dollars), virtualization system 101 may also employ quantity of units of the reusable commodity, as shown in FIG. 3. Service chain visualization system 101 relates all of the input flows and output flows to one another and allows a user to change one flow and visually observe the impact on other flows for inventory planning purposes to meet demand. Visualization system 101 relates the forecasted demand for a particular product to the inventory that supplies that demand while factoring in defective return, repair, refurbished and new buy flows that assist in meeting that forecasted demand. As discussed above, when the user changes the value of one flow, i.e. a parameter, visualization system 101 determines the impact on the other flows, i.e. other parameters. More particularly, when the user changes the value of a particular flow, for example by increasing the value of repair flow 136, in response visualization system 101 correspondingly increases the size of the geometric object that represents that flow. For example, visualization system 101 may increase the size of an arrow representing repair flow 136. In response to the increase in repair flow 136, visualization system 101 may also increase the size of the arrow representing the refurbished flow 138 to represent the corresponding increase in the size of that flow. With more refurbished units being supplied to good inventory 122, the amount of new flow 132 may decrease and thus visualization system 101 decreases the size of the arrow representing new flow 132. In this manner, visualization system 101 enables the user to experiment with changing one flow and observing graphically, i.e. pictorially, the impact on other flows, all in a single service chain visual representation 132 in one embodiment.

Figure 4:
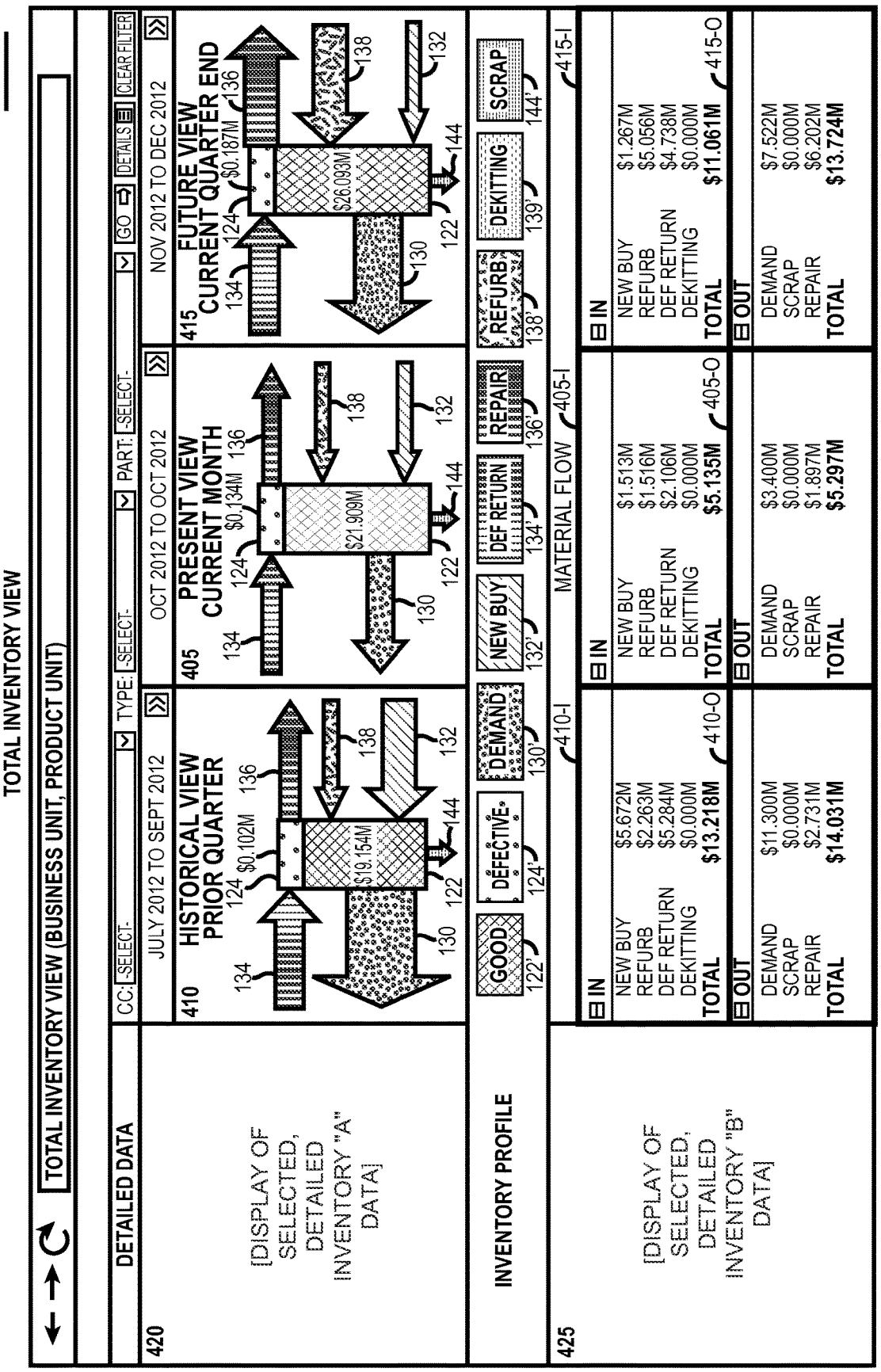
FIG. 4 depicts a service chain visual representation generated by service chain visualization system generates that shows total inventory.

FIG. 4 depicts a more detailed embodiment of the service chain visual representation 132 as service chain visual representation 400. Service chain visual representation 400 is a total inventory view that provides visibility to the entire service chain in one visual representation in this particular embodiment. In one embodiment, the total inventory view of FIG. 4 is for a particular business unit of a business or for a particular product line of a business. In a scenario where Company A manufactures laptop computers, these computers includes several commodities that may be reusable at some point, for example motherboards, hard drives, LCD panels, keyboards and system memory to name a few. The total inventory that service chain visual representation 400 depicts represents the total inventory of all these different commodities expressed in terms of monetary value (dollars in this example.) The total inventory view may also be expressed in terms of a total quantity of units. The total inventory view that service chain visual representation 400 depicts includes a present view 405, a historical view 410 and a future view 415. For discussion purposes, consider the current month to be October 2012. In the service chain visual representation 400 of FIG. 4, present view 405 represents the current month. Historical view 410 represents the prior quarter, namely July 2012-September 2012. Future view 415 represents the current quarter end after the current month, namely November 2012-December 2012.

Referring now to historical view 410 for the prior quarter of July 2012 to September 2012, the value of the total inventory of all good commodities is $19.154M as seen displayed in good inventory 122. Historical view 410 of FIG. 4 includes several elements in common with service chain visual representation 112 of FIG. 2. Like numbers indicate like elements when comparing FIG. 4 with FIG. 2. Service chain visual representation 400 includes a respective identifier tab for each of the input and output flows, and for good and bad inventory of historical view 410. For example, good inventory identifier tab 122' corresponds to good inventory 122. Each identifier tab displayed in service chain visual representation 400 exhibits an alphanumeric label and unique graphic attribute that identifies the corresponding element within historical view 410. For example, good inventory tab 122' exhibits a "GOOD" label and a crosshatched graphic attribute. Inventory 122 exhibits the same crosshatched graphic attribute. In this manner, the user quickly sees that the label "GOOD" refers to good inventory 122 by observing that good inventory identifier tab 122' and inventory 122 exhibit the same crosshatched graphic attribute. Alternatively, the unique graphic attribute of each identifier tab may be a unique color. In this scenario, the identifier tab exhibits the same color as the corresponding flow in historical view 410. For example, if the unique graphic attribute of good inventory identifier 122 tab 122' is the color red, then the color of good inventory 122 is likewise the color red. In one embodiment, each of these tabs, namely inventory identifier tab 122', bad inventory (defective) tab 124', demand identifier tab 130', new buy identifier tab 132', defective return identifier tab 134', repair identifier tab 136', refurbished identified tab 138' and scrap identifier 144' exhibit the same respective colors red, orange, yellow, green, blue, indigo, violet, cyan and magenta as the flows in historical view 410 that they identify, namely good inventory 122, bad inventory (defective) 124, demand flow 130, new buy flow 132, defective return flow 134, repair flow 136, refurbished flow 138 and scrap flow 144.

In one embodiment, clicking on one of tabs 122', 124, . . . 144' causes the service chain visualization system to perform different functions and display different visualizations. For example, clicking or touching a particular tab performs one of the follow three (3) representative functions: 1) display summary information related to that particular tab (e.g. the breakdown of inventory by commodity), 2) display a "drill-down" or "visual drill-up" to a lower or higher level of granularity related to the particular tab, and 3) permit the changing of the value related to the particular tab in a simulation model, to enable the user to see on the display the effect of changing one flow on the other flows.

Still referring to the historical view 410 in FIG. 4, while historical view 410 displays monetary values of $19.154M and $0.102M within the boxes that represent total good inventory 122 and total bad inventory 124 respectively, service chain visual representation 400 includes an input flow historical view 400-I and an output flow historical view 410-O that displays the historical input and output flows alphanumerically. For example, input flow historical view 410-I shows a new buy flow 132 of $5.672, a refurbished flow 138 of $2.263M, a defective return flow 134 of $5.284M and a dekitting flow 139 of $0.000M, yielding a total input flow of $13.218M. Output flow historical view 410-O shows a demand flow 130 of $11.300M, a scrap flow 144 of $0.000M and a repair flow 136 of $2.731M.

Present view 405 is similar to historical view 410 and includes the same flows as historical view 410, except that present view 405 focuses on a current month, for example October 2012, as opposed to a prior quarter. In comparison to historical view 410, present view 405 exhibits a larger good inventory 122 of $21.909M, and thus the geometric figure that represents inventory 122 is physically larger in present view 405 than the corresponding geometry figure of inventory 122 in historical view 410. The sizes of the geometric symbols representing input flows 405-I and output flows 405-O of present view 405 likewise vary in accordance with the values of those flows.

Future view 415 is similar to present view 405 and includes the same flows as present view 405, except that future view 415 focuses on a future quarter end, for example November 2012 to December 2012, as opposed to a current view 405. In comparison to present view 405, future view 415 exhibits a larger good inventory 122 of $26,093M, and thus the geometric figure that represents inventory 122 is physically larger in future view 415 than the corresponding geometric figure of inventory 122 in present view 405. The sizes of the geometric symbols or figures representing input flows 415-I and output flows 415-O of future view 415 likewise vary in accordance with the values of those flows.

The total inventory view 400 of FIG. 4 also includes detailed data panels 420 and 425. More particularly, detailed data panel 420 is a "display selected inventory "A" data" panel and detailed data panel 425 is a "display selected inventory "B" data panel. When the user selects a particular input or output flow represented by one of the arrows in FIG. 4, detailed data panel 420 displays detailed data with respect to that particular flow. Likewise, when the user selects another particular input or output flow represented by one of the other arrows in FIG. 4, detailed data panel 425 displays detailed data with respect to that flow. Graphical examples of the operation of these detailed data panels is shown in FIG. 5 that includes detailed data panels 520 and 525.

Figure 5:
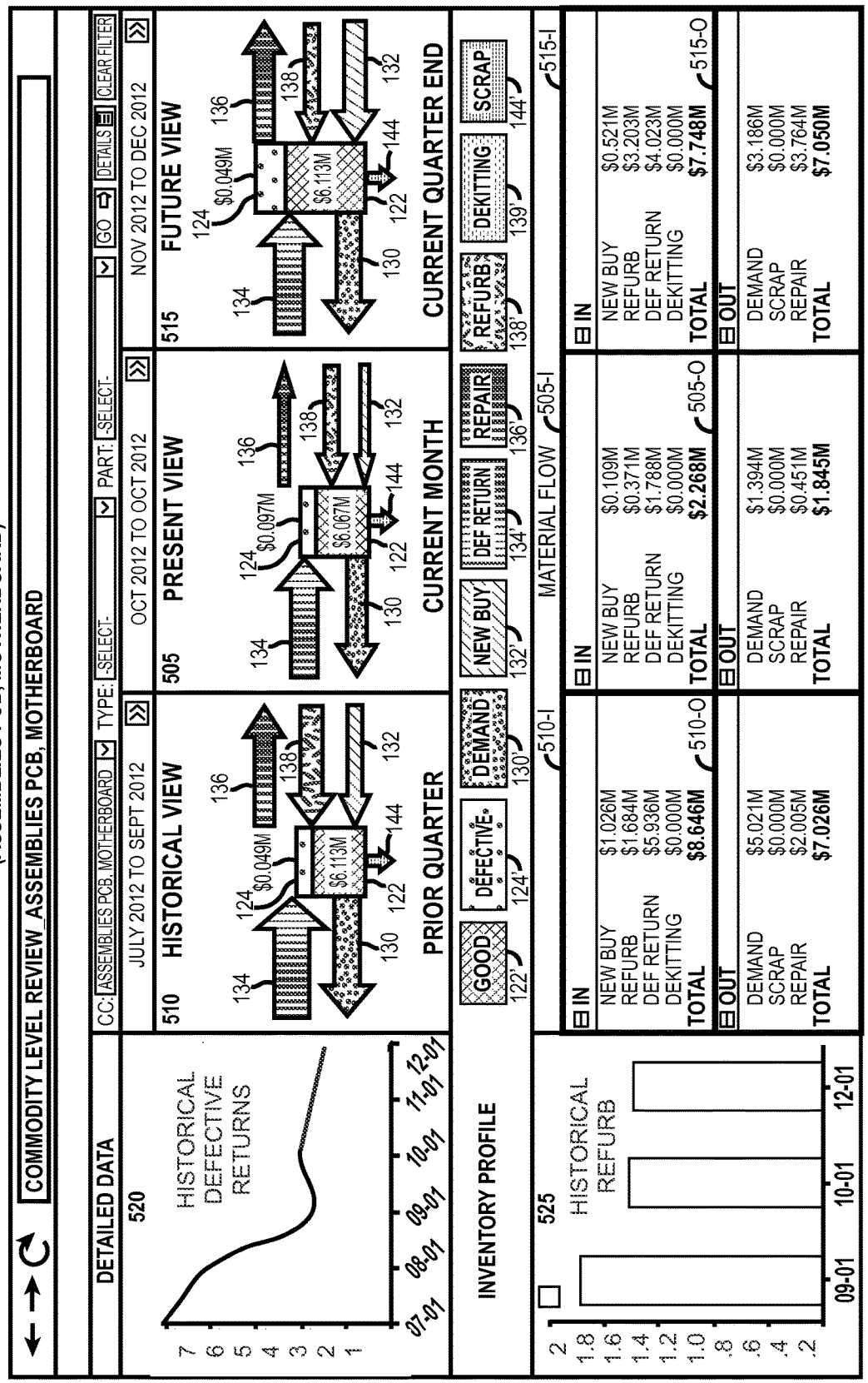
FIG. 5 depicts a service chain visual representation generated by service chain visualization system generates that shows a commodity level representation of flows and inventory.

FIG. 5 depicts an alternative service chain visual representation 500, namely a commodity service chain visual representation, that service chain visualization system 101 may generate at the option of the user. Service chain visual representation 500 of FIG. 5 is similar to the total inventory service chain visual representation 400 that service chain visualization system 101 generates in FIG. 4, except that service chain visual representation 500 is a commodity service chain visual representation that portrays a particular commodity within the total inventory. In other words, whereas service chain visualization system 101 displays the total inventory in the total inventory view in service chain mage 400 of FIG. 4, service chain visualization system 101 focuses on a particular commodity within the inventory to generate the commodity service chain visual representation 500. In the scenario wherein laptop computers are the goods returned to inventory as defective returns, then the commodities within those laptop computers may include motherboards, hard drives, memory and LCD panels. If the user desires to view the service chain related specifically to motherboards, then the user so instructs service chain visualization system 101 to focus on that commodity. In response, service chain visualization system 101 generates the service chain visual representation 500. In this particular example, the user instructs service chain visualization system 101 to generate and display a commodity level view that shows the motherboard commodity within the inventory.

Like numbers indicate like elements when comparing service chain visual representation 500 of FIG. 5 with service chain visual representation 400 of FIG. 4. Historical view 510, present view 505 and future view 515 of FIG. 5 are similar to historical view 410, present view 405, and future view 415 of FIG. 5, except that historical view 510, present view 505 and future view 515 specifically show the portion of inventory that is constituted of motherboards. For example, whereas the total view of inventory that historical view 410 depicts in FIG. 4 is $19.154M, the portion of that total that is constituted of motherboards is $6.113M as shown in historical view 510 of FIG. 5 within good inventory 122 thereof.

Service chain visual representation 500 includes input flow historical view 510-I and output flow historical view 510-O, both flows being associated with historical view 510. Service chain visual representation 500 also includes input flow present view 505-I and output flow present view 505-O, both flows being associated with present view 505. Service chain visual representation 500 further includes input flow future view 515-I and output flow future view 515-O, both flows being associated with future view 515.

Service chain visual representation 500 includes detailed data panels 520 and 525 that operate similarly to detailed data panels 420 and 425, respectively. The user may select any particular input or output flow in service chain visual representation 500, and in response service chain visualization system 101 displays a detailed data panel, such as panel 520 or 525 that displays more detailed data with respect to that particular flow. As shown in FIG. 5, when the user selects defective return flow 134 by clicking on the arrow representing historical defective returns flow 134 in the historical view 510, the service chain visualization system 101 responsively displays detailed historical defective returns data in panel 520. Additionally, in this example, when the user selects historical refurbishment 138 by clicking on the rectangle representing the historical refurbishment 138 in the historical view 510, service chain visualization system 101 responsively displays selected detailed historical refurbishment data. The particular choice of detailed data to display in panels 520 and 525 is a matter of design choice and user selection or the service chain visualization system 101 can make a default selection. Alternatively, panels 520 and/or 525 can be used to display any other desired data.

Figure 6:
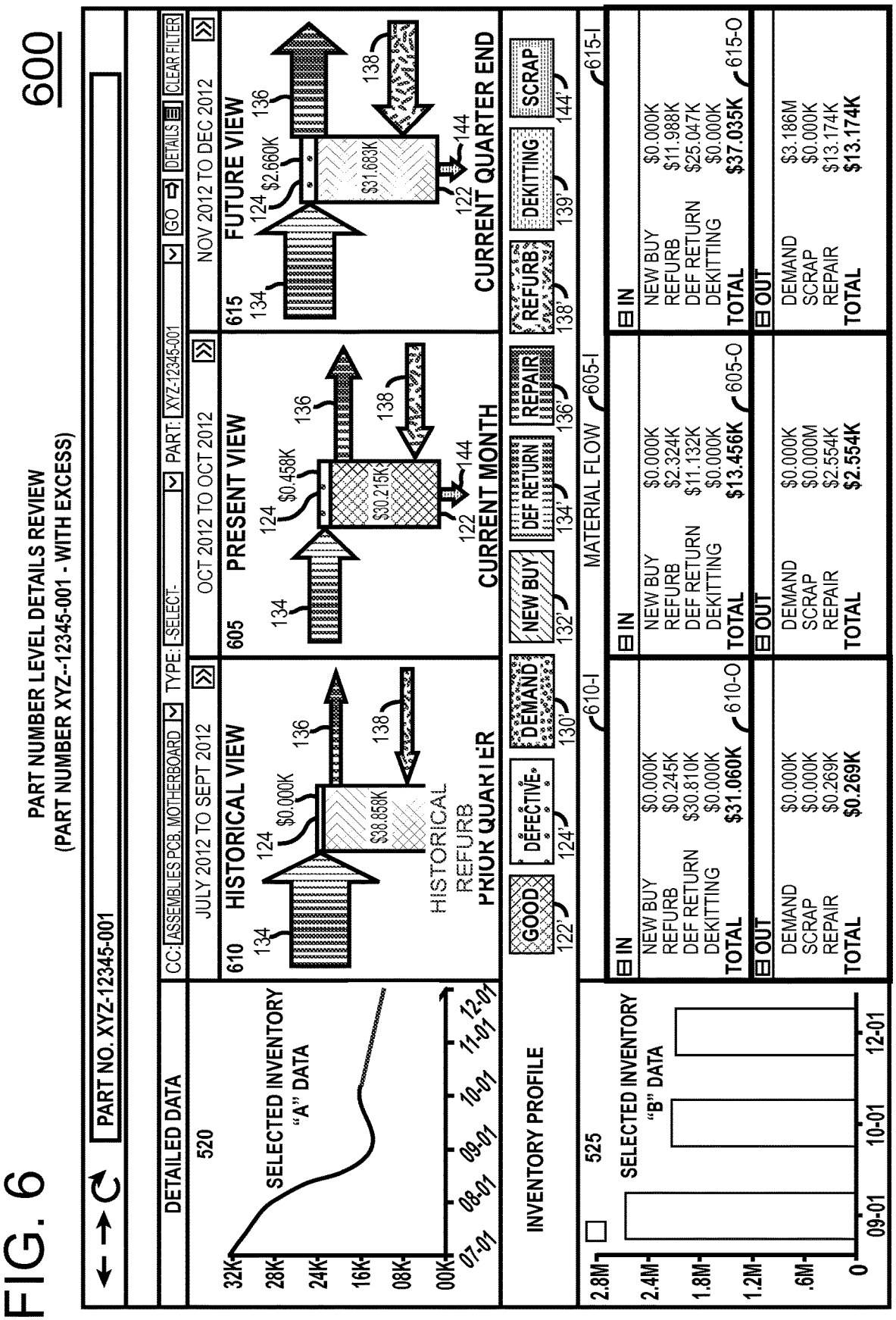
FIG. 6 depicts a service chain visual representation generated by service chain visualization system generates that shows a part number level representation of flows and inventory.

FIG. 6 depicts a part number service chain visual representation 600 that service chain visualization system 101 may generate at the option of the user. Service chain visual representation 600 of FIG. 6 is similar to the commodity service chain visual representation 500 that service chain visualization system 101 generates in FIG. 5, except that service chain visual representation 600 is a part number service chain visual representation that focuses on a particular part number within the commodity shown in the commodity service chain visual representation 500. In other words, whereas service chain visualization system 101 displays a representation of the service chain for a particular commodity in service chain mage 500, service chain visualization system 101 focuses on a particular part number (e.g. XYZ-12345-001) within that commodity to generate the part number service chain visual representation 600. In the scenario wherein laptop computers are the goods returned to inventory as defective returns, then the commodities within those laptop computers may include motherboards, hard drives, memory and LCD panels. If the user desires to view the service chain related specifically to particular motherboard part number, then the user so instructs service chain visualization system 101. In response, service chain visualization system 101 generates the part number service chain visual representation 600 that FIG. 6 depicts. In this particular example, the user instructs service chain visualization system 101 to a display a service chain representation specific to a motherboard part number within the motherboard commodity that is within the total inventory.

Like numbers indicate like elements when comparing part number service chain visual representation 600 of FIG. 6 with commodity service chain visual representation 500 of FIG. 5. Historical view 610, present view 605 and future view 615 of FIG. 6 are similar to historical view 510, present view 505, and future view 515 of FIG. 5, except that historical view 610, present view 605 and future view 615 specifically show the portion of the motherboard commodity that is constituted of motherboards exhibiting a particular part number (e.g. XYZ-12345-001). For example, whereas the commodity view of inventory that historical view 510 depicts in FIG. 5 is $6.113M, the portion of that total that is constituted of motherboards exhibiting a particular part number is $38.858K as shown in historical view 610 of FIG. 6 within good inventory 122 thereof.

Part number service chain visual representation 600 includes input flow historical view 610-I and output flow historical view 610-O, both flows being associated with historical view 610. Part number service chain visual representation 600 also includes input flow present view 605-I and output flow present view 605-O, both flows being associated with present view 605. Part number service chain visual representation 600 further includes input flow future view 615-I and output flow future view 615-O, both flows being associated with future view 615.

Figure 7:
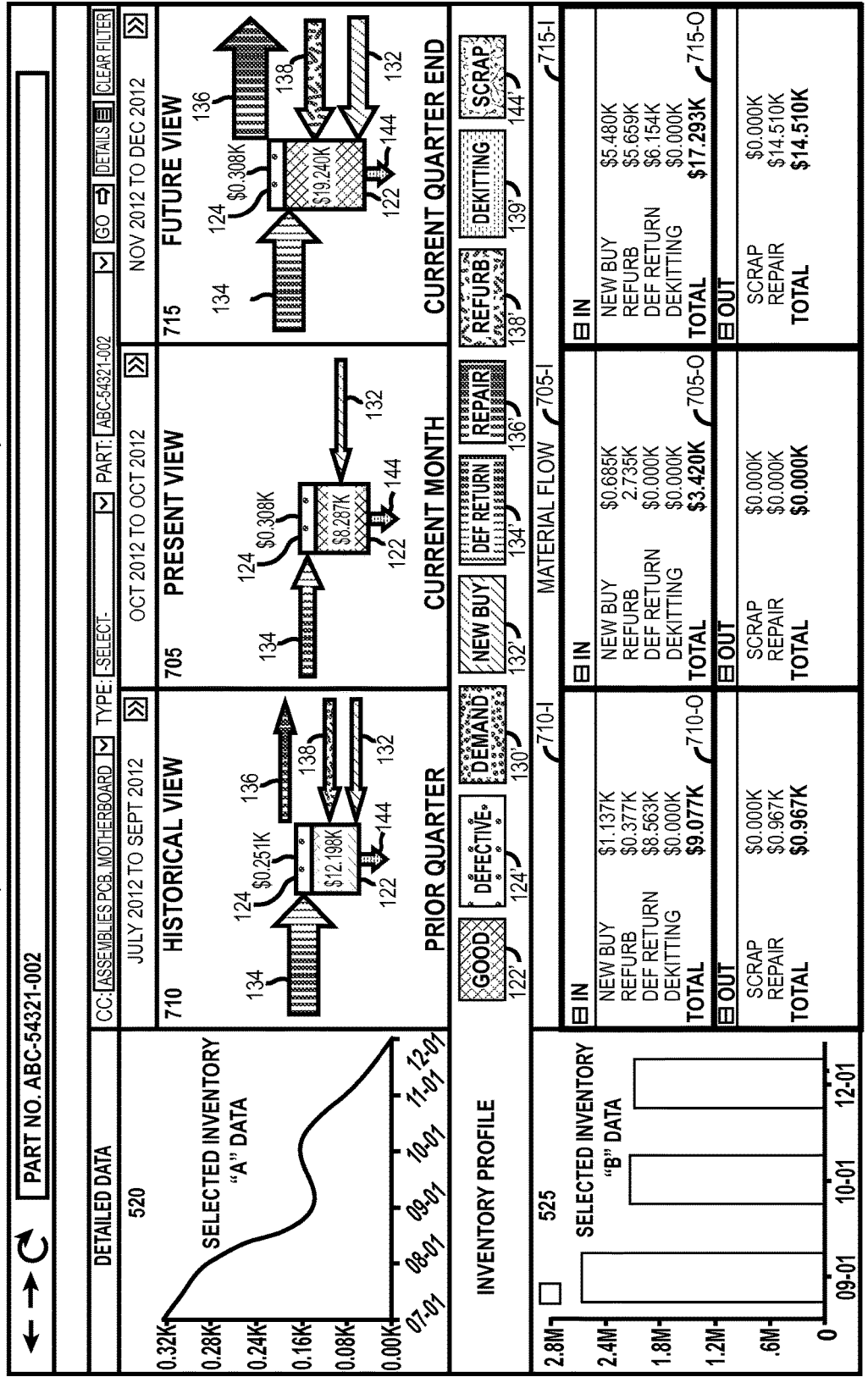
FIG. 7 depicts a service chain visual representation generated by service chain visualization system generates that shows another part number level representation of flows and inventory.

FIG. 7 shows a part number service chain visual representation 700 that service chain visualization system 101 may generate. Part number service chain visual representation 700 of FIG. 7 is similar to the part number service chain visual representation 600 that service chain visualization system 101 generates in FIG. 6, except that part number service chain visual representation 700 focuses on a different part number than part number service chain visual representation 600 of FIG. 6. More particularly, in this example part number service chain visual representation 700 focuses on a representative part number ABC-54321-002 for a different laptop motherboard than shown in FIG. 6. The user may select the particular part number for which the user desires the service chain visualization system 101 to generate a part number service chain visual representation.

Like numbers indicate like elements when comparing part number service chain visual representation 700 of FIG. 7 with part number service chain visual representation 600 of FIG. 6. Historical view 710, present view 705 and future view 715 of FIG. 7 are similar to historical view 610, present view 605, and future view 615 of FIG. 6, respectively, except that historical view 710, present view 705 and future view 715 specifically refer to a different motherboard part number (i.e. part number ABC-54321-002) than the motherboard part number for which the service chain visual representation 600 with which FIG. 6 is concerned. For example, whereas the good inventory of motherboards with part number ABC-54321-002 in historical view 710 is $12.198K in the service chain of FIG. 7, the good inventory of motherboards with part number XYZ-12345-001 is $38.858K in the service chain of FIG. 6.

Part number service chain visual representation 700 includes input flow historical view 7104 and output flow historical view 710-O, both flows being associated with historical view 710. Part number service chain visual representation 700 also includes input flow present view 7054 and output flow present view 705-O, both flows being associated with present view 705. Part number service chain visual representation 700 further includes input flow future view 715-I and output flow future view 715-O, both flows being associated with future view 715.

Figure 8:
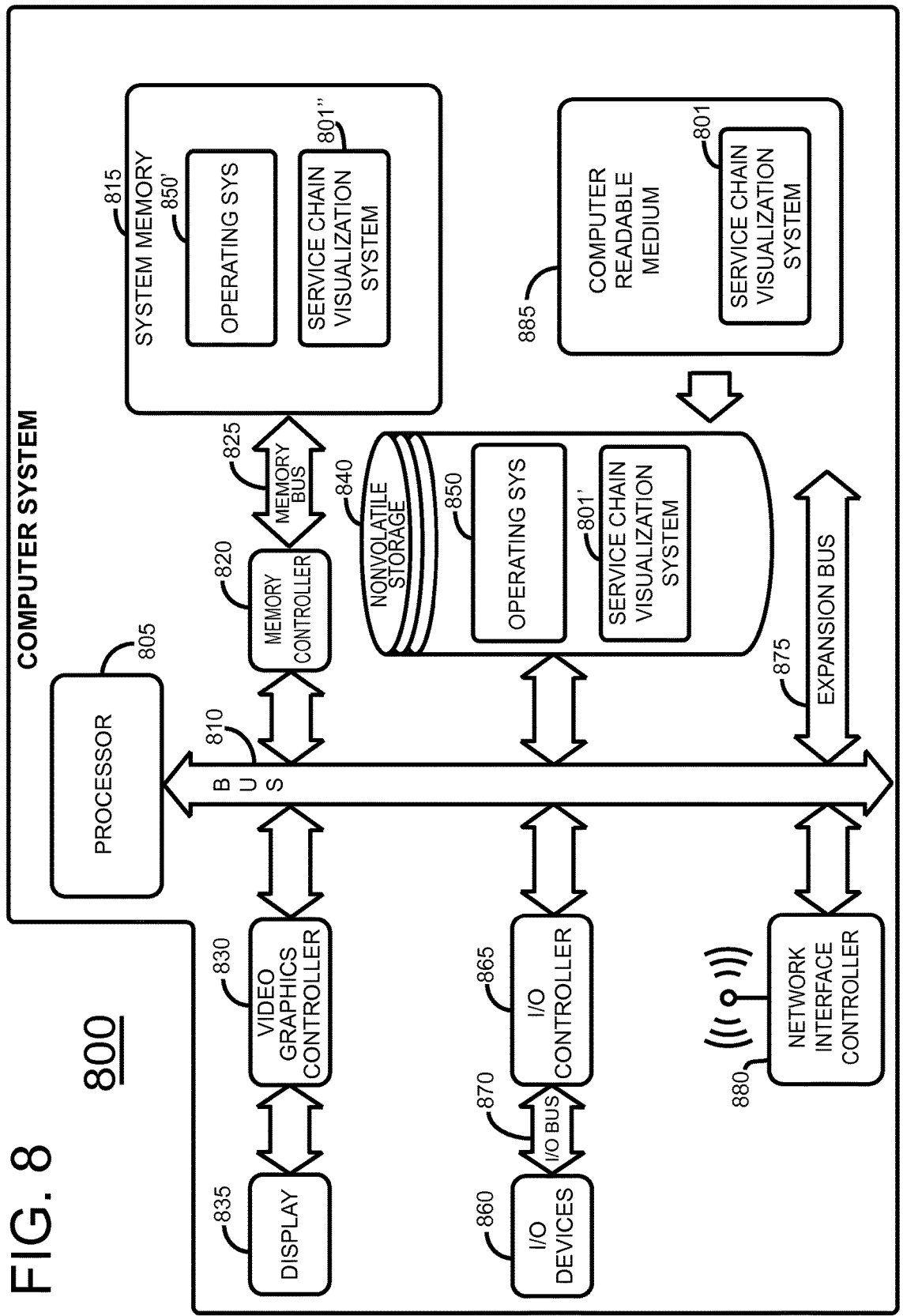
FIG. 8 depicts a block diagram of a representative computer system that includes the service chain visualization system.

FIG. 8 is a block diagram of a computer system 800 used to implement the service chain visualization system 801. The service chain visualization system 801 represents one embodiment of the service chain visualization system 101. The computer system 800 includes a processor 805 that may include multiple cores. The computer system 800 processes, transfers, communicates, modifies, stores or otherwise handles information in digital form, analog form or other form. The computer system 800 includes a bus 810 that couples processor 805 to system memory 815 via a memory controller 820 and memory bus 825. System memory 815 may also be referred to as main memory. System memory 815 may be a static random access memory (SRAM) array or a dynamic random access memory (DRAM) array. Processor 105 may also include local memory such as L1, L1 and L3 caches. A video graphics controller 830 couples display 835 to bus 810. Nonvolatile storage 840, such as a hard disk drive, solid state drive (SSD), CD drive, DVD drive, Blu-ray drive (Blu-ray is a trademark of the Blue-ray Disc Association) or other nonvolatile storage couples to bus 810 to provide computer system 800 with permanent storage of information. System memory 815 and nonvolatile storage 140 are both forms of memory stores. Nonvolatile storage 840 stores an operating system 850 (OPERATING SYS) that governs operation of computer system 800. I/O devices 860, such as a keyboard and a pointing device, couple to bus 810 via I/O controller 865 and I/O bus 870.

One or more expansion busses 875, such as USB, IEEE 1394 bus, ATA, SATA, PCI, PCIE, DVI, HDMI and other busses, couple to bus 810 to facilitate the connection of peripherals and devices to computer system 800. A network interface controller 880 couples to bus 810 to enable computer system 800 to connect by wire or wirelessly to a network and/or other computer systems. Network interface controller 880 may also be called a network communication adapter or a network adapter. While FIG. 1 shows one computer system that employs processor 805, the computer system may take many forms. For example, computer system 800 may take the form of a desktop, server, portable, laptop, notebook, tablet, or other form factor computer or data processing system. Computer system 800 may take other form factors such as a gaming device, a personal digital assistant (PDA), a portable telephone device, a communication device or other devices that include a processor and memory.

The computer system 800 includes a computer readable medium 885 that stores the service chain visualization system 801. The computer readable medium 585 is any memory, such as a CD, DVD, flash drive, or other medium. In actual practice, a user or other entity may load service chain visualization system 801 in non-volatile storage 840 as service chain visualization system 801'. Nonvolatile storage 840 may also store an operating system 850 that controls the operation of computer system 800. When computer system 800 initializes, the computer system loads OS 850 and service chain visualization system 801 into system memory 815 for execution as operating system 850' and service chain visualization system 801".

As discussed above, service chain visualization system 801 collects service chain information from many different sources and marries that information together in computer system 100 to render a service chain visual representation 120 by which the user can readily observe several aspects of the service chain in a single view. In one embodiment, historical, present and future service chain information is visible in the single view, i.e. a single visual representation or same visual representation. This same visual representation may also be referred to as a common visual representation.

FIG. 9 is a block diagram that represents service chain visualization system 801 in computer system 100 together with the multiple information sources from which service chain visualization system 801 receives service chain information. To receive demand information from a demand forecast system 901 that company A employs, service chain visualization system 801 sends a request to demand forecast system 901. In response to receiving the request, demand forecast system 901 sends demand information to service chain visualization system 801 in computer system 100 via demand information network connection 901A. In one embodiment, demand forecast system 901 predicts the number of motherboards that will be needed to repair returned laptop computers as part of, for example, warranty or non-warranty work. Demand forecast system 901 may also predict the number of commodities that will be needed to repair returned laptop computers. For example, demand forecast system 901 may predict the number of motherboards, hard disk drives, memory modules and LCD panels that will be needed to repair returned laptop computers over a particular selected time period.

Service chain visualization system 801 receives new buy information from the enterprise resource planning (ERP) system 905 of company A. In this particular embodiment, company A is a company that manufactures laptop computers for company B that sells the laptop computers. In this respect, company B is a customer of company A. To receive new buy information from ERP system 905, service chain visualization system 801 sends a request for new buy information to ERP system 905 via new buy network connection 905A. In response, ERP system 905 sends the requested new buy information to service chain visualization system 801 via new buy network connection 905A.

Service chain visualization system 801 receives defective return information from the enterprise resource planning (ERP) system 910 of company B. To receive new buy information from ERP system 910, service chain visualization system 801 sends a request for defective return information to ERP system 910 via new buy network connection 910A. In response, ERP system 910 sends the requested defective return information to service chain visualization system 801 via defective return network connection 905A.

Service chain visualization system 801 receives repair (i.e. out-for-repair) information from a repair database 915 that company A maintains. Repair database 915 stores information with respect to the particular commodity items that company A has sent to a repair facility. For example, repair database 915 may store information that identifies all motherboard commodities by part number that company A sent to the repair facility. To receive repair information from repair database 915, service chain visualization system 801 sends a request for repair information to repair database 915 via new repair information connection 915A. In response, repair database 915 sends the requested repair information to service chain visualization system 801 via repair network connection 915A. The repair information indicates all commodities, such as motherboards, that are currently in the repair facility. The repair information may include the part number of each commodity item at the repair facility and the quantity of units at the repair facility for each commodity.

Service chain visualization system 801 receive units refurbished information from a transport company, i.e. shipping company, that describes the particular motherboard units that the repair facility is currently shipping back to company A via the transport company. Transport database 920 stores information with respect to the particular refurbished commodity items by part number that the repair facility is shipping back to company A. To receive refurbished information, i.e. refurbishing complete information, from refurbished database 920 service chain visualization system 801 sends a request for refurbished information to the refurbished database 920 of the transport company via refurbished information connection 920A. In response, repair database 915 sends the requested repair information to service chain visualization system 801 via repair network connection 925A. The refurbished information indicates all commodities, such as motherboards, currently being shipped from the repair facility back to company A. The refurbished information may include the part number of each commodity item currently in transit form the repair facility as well as the quantity of each commodity in transit.

Company A employs a warehouse management system (WMS) 925 that stores good inventory information, bad inventory information, refurbished inventory information and scrap inventory information. Repaired inventory forms a part of the good inventory. Scrap inventory forms a portion of bad inventory that is to be discarded, such as by recycling or other disposal. WMS 925 provides inventory information in terms of quantity of units or monetary value (dollars), or both quantity of units and monetary value, for each of the 4 types of inventory above. WMS 925 stores information describing inventory by total number of complete products (e.g. laptop computers), by commodity (motherboard, hard drive, memory and LCD display panel) and by part number.

To receive repaired inventory information from WMS 925, service chain visualization system 801 sends a request for repaired inventory information to WMS 925 via repaired inventory information connection 925A. Repaired inventory is another term for refurbished inventory. In response to the request for repaired inventory information, WMS 925 sends the requested repaired inventory information to service chain visualization system 801 via repair inventory network connection 925A.

To receive good inventory information from WMS 925, service chain visualization system 801 sends a request for good inventory information to the WMS 925 via good inventory information connection 925B. In response to the request for good inventory information, WMS 925 sends the requested good inventory information to service chain visualization system 801 via good inventory network connection 925B. The good inventory information may include the quantity or number of complete products (e.g. laptop computers) in good inventory, the quantity of particular commodities in good inventory, and the part numbers of those finished products and commodities in good inventory.

To receive had inventory information from WMS 925, service chain visualization system 801 sends a request for bad inventory information to the WMS 925 via bad inventory information connection 925C. In response to the request for bad inventory information, WMS 925 sends the requested bad inventory information to service chain visualization system 801 via bad inventory network connection 925C. The bad inventory information may include the total number of finished products (e.g. laptop computers) in bad inventory, the quantity of particular commodities in bad inventory, and the part numbers of those finished products and commodities in bad inventory.

To receive scrap inventory information from WMS 925, service chain visualization system 801 sends a request for scrap inventory information to WMS 925 via scrap inventory information connection 925D. In response to the request for scrap inventory information, WMS 925 sends the requested scrap inventory information to service chain visualization system 801 via scrap inventory network connection 925D. The scrap inventory information may include the total number of complete products (e.g. laptop computers) in scrap inventory, the quantity of particular commodities in scrap inventory, and the part numbers of those finished products and commodities in scrap inventory.

In actual practice, computer system 100 and service chain visualization system 801 may connect to information sources 901, 905, 910, 915, 920 and 925 via a network connection, such as a local area network, a wide area network, a wireless network connection, a wired network connection and/or an Internet network connection.

Figure 10A:
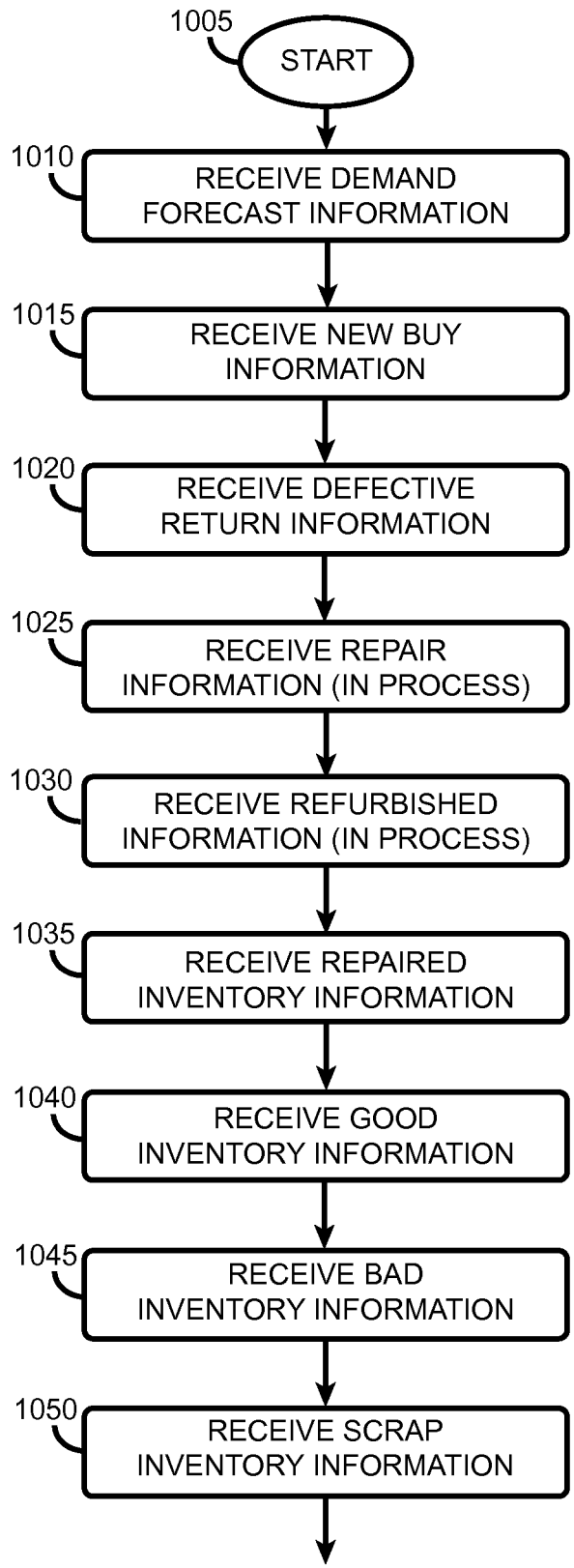
FIGS. 10A-10B collectively depict a process flow chart throne embodiment of the service chain visualization system.
Figure 10B:
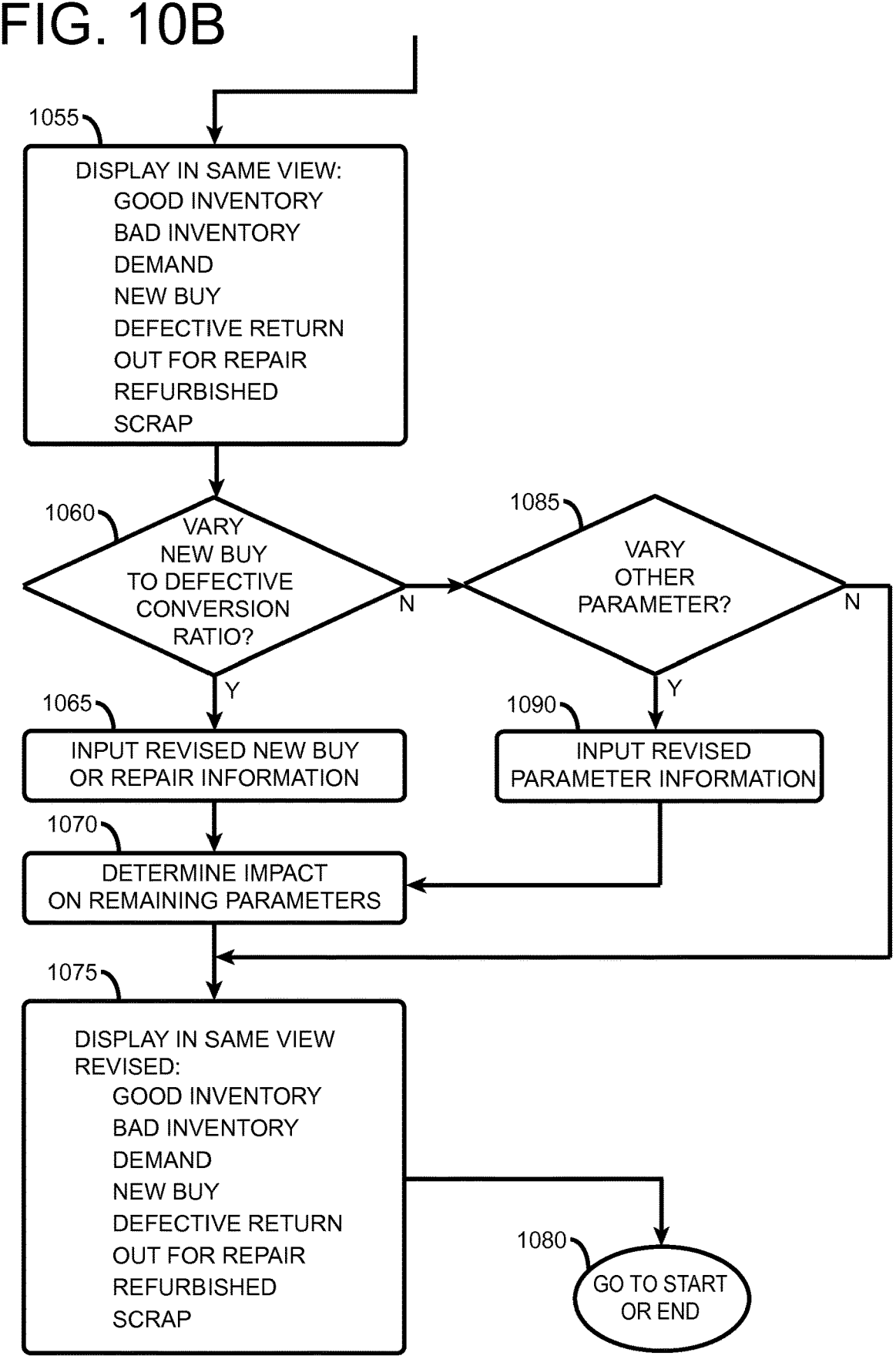

FIGS. 10A and 10B collectively depict a flowchart representing one embodiment of operations of the service chain visualization system 801. Service chain visualization system 801 collects information from many different information sources and integrates that information to provide a common view representing a service chain to the user of the system 801. Service chain visualization system 801 receives demand information from a demand forecasting system, as per block 1010. In a service chain, the demand may be satisfied by a combination of new buys of commodities needed for repair and conversion of defective commodities to good commodities. The defective commodities are commodities that may come from the return of defective products by customers and others, and from a portion of new buys that may be defective. For example, in a scenario where company A manufactures laptop computers for sale by company B, the service chain involves company A repairing defective laptop computers that customers may return to company B who sends the defective laptop computers along to company A for repair. The returned laptop computers are built from commodities, i.e. such as motherboards, hard drives, memory and LCD panels. These commodities provide reusable parts useful for repair of other products. Some of these commodities contained in returned product may be found in testing to be good commodities that do not require repair. During testing, other commodities may test as being defective and may be sent to a repair facility for repair at the option of the user of service chain visualization system 801. Upon return from the repair facility, the repaired commodity may enter good inventory from which it may be pulled to repair a defective returned product at a later time. When a defective laptop computer is returned to company A by company B and that defective laptop computer is found to have a detective motherboard, the replacement motherboard necessary to repair the defective laptop computer may come from a new buy of motherboards or by repair of defective motherboards there were in previously returned defective products.

In the disclosed service chain visualization system methodology, service chain visualization system 801 receives new buy information from company A's ERP system, as per block 1015. Service chain visualization system 801 also receives defective return information from the customer's ERP system, as per block 1020. For example, company B as a customer of company A provides defective return information to company A. While company A typically receives completed products (e.g. laptop computers) from company B, it is also possible that some entities may return commodities such as motherboards, disk drives, memory and LCD panels to company A through harvesting activities. Harvesting refers to a scenario where company A actively solicits or requests the submission of products and/or commodities from another entity at which the products or commodities are typically not currently being used.

Service chain visualization system 801 receives repair information that indicates those commodities, e.g. motherboards, that are out-for-repair at a repair facility, as per block 1025. A repair database in company A may provide this repair information. Service chain visualization system 801 receives refurbished information that informs system 801 of the number of repaired, i.e. refurbished, commodities currently in shipment from the repair facility back to company A, as per block 1030. A transportation company, i.e. shipping company, sends the refurbished information to service chain visualization system 801. Service chain visualization system 801 may store this repair information as repaired inventory information that is a part of good inventory. Service chain visualization system 801 receives repaired inventory information from company A's WMS 925.

Service chain visualization system 801 receives good inventory information, bad inventory information, and scrap inventory information as per blocks 1040, 1045 and 1050, respectively from company A's WMS 925. Upon initialization, service chain visualization system 801 displays the good inventory information, bad inventory information, demand information, new buy information, defective return information, out-for-repair information, refurbished information and scrap information all in the same visual representation, such as service chain visual representation 112, as per block 1055. In one embodiment, service chain visualization system 801 sizes the geometric object, i.e. geometric symbol, representing each of the different types of information in service chain visual representation 112 to a size that directly corresponds to the quantity of units and/or monetary value indicated by that type of information. Service chain visualization system 801 may express each object in terms of quantity of units (e.g. number of motherboards) or currently (e.g. dollars). For example, if an arrow is the particular geometric object selected to represent each of the different types of service chain information, then the width and/or length of the arrow varies with the quantity that the arrow represents, as described above in more detail. If a particular size arrow represents $10M of new buy information, then service chain visualization system 801 uses a proportionately larger size arrow to represent $20M of new buy information. Similarly, if a particular size rectangle represents $25M of good inventory, then service chain visualization system 801 employs a proportionately larger size rectangle to represent $35M in good inventory.

In one embodiment, service chain visualization system 801 monitors the input and output flows and determines if any flow falls below a respective flow threshold target minimum value or exceeds a respective threshold target maximum value. The threshold target minimum and maximum values may be set by management or other authorized personnel. When service chain visualization system 801 detects a particular flow that falls below the respective threshold target minimum value or exceeds the respective threshold target maximum value, service chain visualization system 801 generates an alert on the display 106 or provides an audio alert or other alert to make the user aware of the situation. This enables management or others to take appropriate action such as ordering more new commodities, sending more returned commodities out for repair, or other action to address the problem detected.

In one embodiment, the service chain visualization system enables the user to effectively simulate "what-if" scenarios to gain valuable perspective with respect to particular decisions that can be made to better manage the service chain. The user can effectively submit new scenarios to the service chain visualization system by changing the value of one or more input or output flows and Observing the effect on the remaining flows. The user may manipulate the present input flow data or output flow data, and in response the service chain visualization system will visually display the resultant input and output flows in the format of FIG. 1B or FIGS. 4-6. Alternatively, the user may input new input flow data or output flow data and in response the service chain will likewise visually display the resultant input and output flows for easy interpretation by the user. The user may thus input hypothetical input flow data or output flow data as a substitute for actual service chain input flow data and output flow data to visually Observe the impact on the service chain.

In one embodiment, after pictorially displaying the diverse types of information in a common view as described above, the service chain visualization system queries the user to indicate if the user would like to vary the "new buy to defective conversion ratio", as per decision block 1060. The user may thus engage in a hypothetical "what-if" scenario. As an example, the new buy to defective conversion ratio is the ratio of new buys to conversions of defective returns to refurbished commodities. The user may wish to simulate a decrease in expenses by decreasing the new buy to defective conversation ratio, such that more commodities (e.g. motherboards) are repaired and there are fewer new buys. If the user desires to vary the new buy to defective conversion ratio at decision block 1060, then the user inputs revised new buy information and/or revised repair information into service chain visualization system 801, as per block 1065. For discussion purposes, consider the scenario where the user wishes to decrease the new buy to defective conversion ratio as described above. The user may input revised new buy information that indicates a lower number of new buy motherboards, or a lower monetary value (e.g. dollar amount) for new buy motherboards. In response, service chain visualization system 801 determines the impact on remaining parameters such as the repair (out-for-repair) information, the refurbished (coming back from repair) information, the repaired inventory information, the good inventory information, the bad inventory information and the scrap inventory information.

More particularly, in response to the user inputting a lower number of new buy motherboards, service chain visualization system 801 may increase the number of motherboards to be sent to the repair facility to compensate, i.e. balance, for the decrease in new buy motherboards to enable fulfilling the same demand. Service chain visualization system 801 thus operates in closed-loop fashion to balance new buy motherboards with repaired motherboards to fulfill demand. In this manner, the combined good inventory of new buy motherboards and repaired motherboards still fulfill the same forecasted demand. After determining the impact on the other parameters, service chain visualization system displays the same view as before except with parameters revised, for example, for the new buys and repaired/refurbished motherboards, in the manner discussed above. More particularly, all in the same view, service chain visualization system 801 displays revised new buy information, revised refurbished information and revised repaired inventory information and other service chain information, as per block 1075. In this manner, by varying the new buy information, the user may test the impact on other parts of the service chain before committing to those changes. The user may end the disclosed process at end block 1080 or alternatively, the user may instruct service chain visualization system 801 to return to start block 1005 to model another service chain scenario.

Returning now to decision block 1060, if the user decides not to change the new buy to defective conversion ratio, then service chain visualization system 801 queries the user to ask if the user desires to vary another parameter other than new buys or defect conversions. For example, the user may wish to model consequences in the service chain should there be an increase in demand. In this scenario, the user inputs revised demand information as revised parameter information in block 1090. Service chain visualization system 801 determines the impact on remaining parameters, as per block 1070. For example, in response to the increase in demand in the demand information, supply chain visualization system 801 may proportionately increase both the new buys and the refurbished commodities in the new buy information and refurbished information, respectively. Service chain visualization system 801 displays the revised parameter information all in the same view as per block 1075. Process flow may end at end block 1080 or, at the user's election, may continue back to start block 1005 to model another service chain scenario.

As will be appreciated by one skilled in the art, aspects of the service chain visualization system and method may be embodied as a system, method or computer readable medium. Accordingly, aspects of the service chain visualization system and method may take the for of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the service chain visualization system and method may take the form of a computer readable medium embodied in one or more computer readable media having computer readable program code embodied thereon.

Any combination of one or more computer readable media may be utilized. The computer readable medium may be a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the service chain visualization system and method may be written in any combination of one or more programming languages, including an object oriented programming language such as Java, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the FIGS. 10A-10B flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of 10A-10B and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIGS. 10A-10B described above.

The flowchart of FIGS. 10A-10B illustrates the architecture, functionality, and operation of possible implementations of systems, methods and computer readable media that perform network analysis in accordance with various embodiments of the service chain visualization system and method. In this regard, each block in the flowcharts of FIGS. 10A-10B may represent a module, segment, or portion of code, which comprises one or more executable instructions for implementing the specified logical function(s). It should also be noted that, in some alternative implementations, the functions noted in the block may occur out of the order noted in FIGS. 10A-10B. For example, two blocks shown in succession may, in fact, be executed substantially concurrently, or the blocks may sometimes be executed in the reverse order, depending upon the functionality involved. It will also be noted that each block FIG. 3 and combinations of blocks in the block diagrams and/or flowchart illustration, can be implemented by special purpose hard ware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the service chain visualization system and method has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for controlling a closed loop, service chain visualization system to transform multi-faceted data into a useful and human user apprehensible visual representation, the method comprising:
   executing code by a processor of the service chain visualization system to configure the service chain visualization system into a machine to perform:
   (a) receiving in a memory dynamically varying service chain inventory data of service chain inventory of commodities, input flows of commodities into the service chain inventory, and output flows of commodities from the service chain inventory, wherein variation of the dynamic service chain inventory data over time depends on changes over time of at least numbers of repairs, returns, and demand of a product and the closed loop, service chain inventory data is multi-faceted, and represents a balanced, closed-loop system;

(b) accessing the dynamically varying service chain inventory data in the memory and processing the dynamically varying service chain inventory data received to determine, for each received variation of the dynamically varying service chain inventory data over time, the service chain inventory of commodities, input flows of commodities into the service chain inventory, and output flows of commodities from the service chain inventory; and (c) controlling an electronic display of a display device and transforming the display by (i) displaying the visual, symbology representations of the inventory, the input flows, and the output flows as respective non-textual symbols and (ii) dynamically varying one or more physical dimensions of the visual, symbology representations in accordance with dynamic variations in the service chain inventory data to change appearances of the visual, symbology representations to maintain a representation of dynamic balance within the closed-loop system; and repeating (a), (b), and (c) as dynamically varying service chain inventory data is received in (a) which updates modulation of the electronic visualization;

wherein the visual, symbology representation, including non-textual elements, consolidates display of the inventory, input flows, and output flows of the commodities to transform the multi-faceted data into a useful and human user apprehensible visual representation of the dynamic balance of the service chain inventory of commodities, the input flows of commodities into the service chain inventory, and the output flows of commodities from the service chain inventory.

2. The method of claim 1, wherein the commodities are members of a group consisting of: components and assemblies of components and are used to repair one or more products.

3. The method of claim 1, wherein the input flows of commodities represent at least a new commodity buy information and completion of refurbishment information.

4. The method of claim 2, wherein one of the output flows represents commodity demand information.

5. The method of claim 4, wherein one of the output flows represents at least one member of a group consisting of commodity out-for-repair information and defective returns information.

6. The method of claim 1 further comprising:
transforming the display of a display device by displaying the visual, symbology representations of the inventory, the input flows, and the output flows as respective non-textual symbols, and each symbol has a dimension corresponding to a value associated with the inventory, the input flows, and the output flows.

7. The method of claim 6 wherein the dimension is a height of the symbol.

8. The method of claim 6 wherein the value is member of a group consisting of a monetary value and a quantity of the inventory, each of the input flows, and each of the output flows.

9. The method of claim 1, further comprising:
receiving information that changes a value of one or more of the inventory, the input flows, and the output flows; and transforming the display of a display device by modifying the visual, symbology representations of the inventory, the input flows, and the output flows in accordance with the received information to balance the representations in accordance with a closed loop service chain.

10. The method of claim 1 further comprising:
utilizing the modulated electronic visualization of the expanding and contracting graphical, visual, symbology elements to adjust the various flows into and out of inventory to meet a particular demand flow.

11. The method of claim 1 wherein the physical dimensions comprise a height and width and dynamically varying one or more physical dimensions of the visual, symbology representations in accordance with dynamic variations in the service chain inventory data comprises expanding and contracting one or more of the height and width.

12. A closed loop, service chain visualization system to transform multi-faceted data into a useful and human user apprehensible visual representation, the system comprising:
a processor; and
a non-transitory, computer readable storage medium coupled to the processor, the computer readable storage medium includes code stored therein and executable by the processor to configure the service chain visualization system into a machine to:

(a) receive in a memory dynamically varying service chain inventory data of service chain inventory of commodities, input flows of commodities into the service chain inventory, and output flows of commodities from the service chain inventory, wherein variation of the dynamic service chain inventory data over time depends on changes over time of at least numbers of repairs, returns, and demand of a product and the closed loop, service chain inventory data is multi-faceted, and represents a balanced, closed-loop system;

(b) process the dynamic, varying service chain inventory data received to determine, for each received variation of the dynamically varying service chain inventory data over time, the service chain inventory of commodities, input flows of commodities into the service chain inventory, and output flows of commodities from the service chain inventory; and (c) control an electronic display and transform the display by (i) displaying the visual, symbology representations of the inventory, the input flows, and the output flows as respective non-textual symbols and (ii) dynamically varying one or more physical dimensions of the visual, symbology representations in accordance with dynamic variations in the service chain inventory data to change appearances of the visual, symbology representations to maintain a representation of dynamic balance within the closed-loop system; and wherein the visual, symbology representation, including non-textual elements, consolidates display of the inventory, input flows, and output flows of the commodities to transform the multi-faceted data into a useful and human user apprehensible visual representation of the dynamic balance of the service chain inventory of commodities, the input flows of commodities into the service chain inventory, and the output flows of commodities from the service chain inventory; and (d) utilize the modulated display visualization of the expanding and contracting graphical, visual, symbology elements to adjust the various flows into and out of inventory to meet a particular demand flow; and repeating (a), (b), (c), (d) as dynamically varying service chain inventory data is received in (a) which updates modulation of the electronic visualization.

13. The service chain visualization system of claim 12, wherein the commodities are members of a group consisting of: components and assemblies of components and are used to repair one or more products.

14. The service chain visualization system of claim 12, wherein one of the input flows of commodities represents new commodity buy information and another of the input flows of commodities represents refurbishing complete information.

15. The service chain visualization system of claim 12, wherein one of the output flows represents commodity demand information.

16. The service chain visualization system of claim 12, wherein one of the output flows represents at least one member of a group consisting of commodity out-for-repair information and defective returns information.

17. The service chain visualization system of claim 12, wherein the service chain visualization system is further configured to:

transform the display of a display device to display the visual, symbology representations of the inventory, the input flows, and the output flows as respective symbols, and each symbol has a dimension corresponding to a value associated with the inventory, the input flows, and the output flows.

18. The service chain visualization system of claim 17, wherein the value is member of a group consisting of a monetary value and a quantity of the inventory, each of the input flows, and each of the output flows.

19. The service chain visualization system of claim 12, wherein the service chain visualization system is further configured to:

receive information that changes a value of one or more of the inventory, the input flows, and the output flows; and transform the display of a display device to modify the visual, symbology representations of the inventory, the input flows, and the output flows in accordance with the received information to balance the representations in accordance with a closed loop service chain.

20. The system of claim 12 wherein the physical dimensions comprise a height and width and dynamically varying one or more physical dimensions of the visual, symbology representations in accordance with dynamic variations in the service chain inventory data comprises expanding and contracting one or more of the height and width.

21. A non-transitory computer readable medium comprising instructions executable by a processor for controlling a closed loop, service chain visualization system to transform multi-faceted data into a useful and human user apprehensible visual representation and configuring the service chain visualization system into a machine for:

(a) receiving in a memory dynamically varying service chain inventory data of service chain inventory of commodities, input flows of commodities into the service chain inventory, and output flows of commodities from the service chain inventory, wherein variation of the dynamic service chain inventory data over time depends on changes over time of at least numbers of repairs, returns, and demand of a product and the closed loop, service chain inventory data is multi-faceted, and represents a balanced, closed-loop system;

(b) processing the dynamic, varying service chain inventory data received to determine, for each received variation of the dynamically varying service chain inventory data over time, the service chain inventory of commodities, input flows of commodities into the service chain inventory, and output flows of commodities from the service chain inventory; and (c) controlling an electronic display of a display device and transforming the display by (i) displaying the visual, symbology representations of the inventory, the input flows, and the output flows as respective non-textual symbols and (ii) dynamically varying one or more physical dimensions of the visual, symbology representations in accordance with dynamic variations in the service chain inventory data to change appearances of the visual, symbology representations to maintain a representation of dynamic balance within the closed-loop system; and wherein the visual, symbology representation, including non-textual elements, consolidates display of the inventory, input flows, and output flows of the commodities to transform the multi-faceted data into a useful and human user apprehensible visual representation of the dynamic balance of the service chain inventory of commodities, the input flows of commodities into the service chain inventory, and the output flows of commodities from the service chain inventory;

(d) utilizing the modulated display visualization of the expanding and contracting graphical, visual, symbology elements to adjust the various flows into and out of inventory to meet a particular demand flow; and repeating (a), (b), (c), (d) as dynamically varying service chain inventory data is received in (a) which updates modulation of the electronic visualization.

22. The computer readable medium of claim 21, wherein the commodities are members of a group consisting of: components and assemblies of components and are used to repair one or more products.

23. The computer readable medium of claim 21, wherein one of the input flows of commodities represents new commodity buy information and another of the input flows of commodities represents refurbishing complete information.

24. The computer readable medium of claim 21, wherein one of the output flows represents at least one member of a group consisting of commodity out-for-repair information and defective returns information.

25. The computer readable medium of claim 21, wherein the instructions are further executable by the processor to further configure the computer system into the machine for:

transforming the display of a display device by displaying the visual, symbology representations of the inventory, the input flows, and the output flows as respective non-textual symbols, and each symbol has a dimension corresponding to a value associated with the inventory, the input flows, and the output flows.

26. The computer readable medium of claim 25, wherein the value is member of a group consisting of a monetary value and a quantity of the inventory, each of the input flows, and each of the output flows.

27. The computer readable medium of claim 21, wherein the instructions are further executable by the processor to further configure the computer system into the machine for:

receiving information that changes a value of one or more of the inventory, the input flows, and the output flows; and transforming the display of a display device by modifying the visual, symbology representations of the inventory, the input flows, and the output flows in accordance with the received information to balance the representations in accordance with a closed loop service chain.

28. The computer readable medium of claim 21 wherein the physical dimensions comprise a height and width and dynamically varying one or more physical dimensions of the visual, symbology representations in accordance with dynamic variations in the service chain inventory data comprises expanding and contracting one or more of the height and width.

* * * * *